(12) United States Patent
Zubiaur et al.

(10) Patent No.: US 11,369,006 B2
(45) Date of Patent: Jun. 21, 2022

(54) IOT GATEWAY DEVICE, SYSTEM, AND COMPUTER PROGRAM PRODUCT

(71) Applicant: Urbit Group LLC, San Antonio, TX (US)

(72) Inventors: Joaquin Patron Zubiaur, Cdmx (MX); Jose Maria Taracena Gonzalez, Alcaldia la Magdalena Contreras (MX)

(73) Assignee: Urbit Group LLC, San Antonio, TX (US)

( * ) Notice: Subject to any disclaimer, the term of this patent is extended or adjusted under 35 U.S.C. 154(b) by 210 days.

(21) Appl. No.: 16/907,147

(22) Filed: Jun. 19, 2020

(65) Prior Publication Data
US 2021/0400767 A1 Dec. 23, 2021

(51) Int. Cl.
*H04W 88/16* (2009.01)
*H02J 50/00* (2016.01)
*H01Q 1/22* (2006.01)
*H01Q 21/28* (2006.01)

(52) U.S. Cl.
CPC .......... *H04W 88/16* (2013.01); *H01Q 1/2283* (2013.01); *H01Q 21/28* (2013.01); *H02J 50/005* (2020.01)

(58) Field of Classification Search
CPC .... H04W 88/16; H02J 50/005; H01Q 1/2283; H01Q 21/28
See application file for complete search history.

(56) References Cited

U.S. PATENT DOCUMENTS

| | | | |
|---|---|---|---|
| 9,860,677 B1 | 1/2018 | Agerstam et al. | |
| 10,270,863 B1 | 4/2019 | Swengler | |
| 10,291,714 B2 | 5/2019 | Mathews et al. | |
| 2014/0349848 A1* | 11/2014 | Braun ................. | C07D 213/75 548/197 |
| 2018/0034914 A1 | 2/2018 | Christopher et al. | |
| 2018/0234266 A1* | 8/2018 | Rudolph ................ | H04L 67/12 |
| 2019/0289082 A1 | 9/2019 | Furuichi et al. | |

(Continued)

FOREIGN PATENT DOCUMENTS

| | | |
|---|---|---|
| CN | 203289469 U | 11/2013 |
| CN | 107846668 A2 | 3/2018 |

(Continued)

*Primary Examiner* — Duc C Ho

(57) ABSTRACT

A zero-touch wireless apparatus, and associated method of use to deliver data collected from various authorized wireless devices and IoT sensors to a central repository in the Cloud, using one or more of Bluetooth®, Wi-Fi™®, LoRaWAN™, L-Band satellite, global GPS constellations and/or cellular GSM frequencies. The device comprises of a single body enclosure able to sustain adverse outdoor conditions protecting a plurality of electronic components within, including a solar power rechargeable battery, and up to five independent wireless telecommunications network components able to find the least cost routing transmission, using wireless methods only. The device operates in motion or static and automatically configures its operating frequencies and data routing alternatives to adapt to any geographical location and network availability. The gateway and all its connected devices and sensors are remotely managed and monitored through a custom designed software application residing in a smartphone or the Cloud.

18 Claims, 18 Drawing Sheets

(56) References Cited

U.S. PATENT DOCUMENTS

| | | | |
|---|---|---|---|
| 2019/0334995 A1 | 10/2019 | Shanmugam | |
| 2019/0342154 A1 | 11/2019 | Nair et al. | |
| 2020/0412565 A1* | 12/2020 | Sanders | H04L 67/125 |
| 2021/0120086 A1* | 4/2021 | Yao | H04L 67/12 |

FOREIGN PATENT DOCUMENTS

| | | | |
|---|---|---|---|
| GB | 2568873 A | 6/2019 | |
| KR | 20180073028 A | 7/2018 | |
| KR | 20190010007 A | 1/2019 | |
| WO | 2017167017 A | 10/2017 | |
| WO | 2018121572 A1 | 7/2018 | |
| WO | 2019168191 A1 | 9/2019 | |

\* cited by examiner

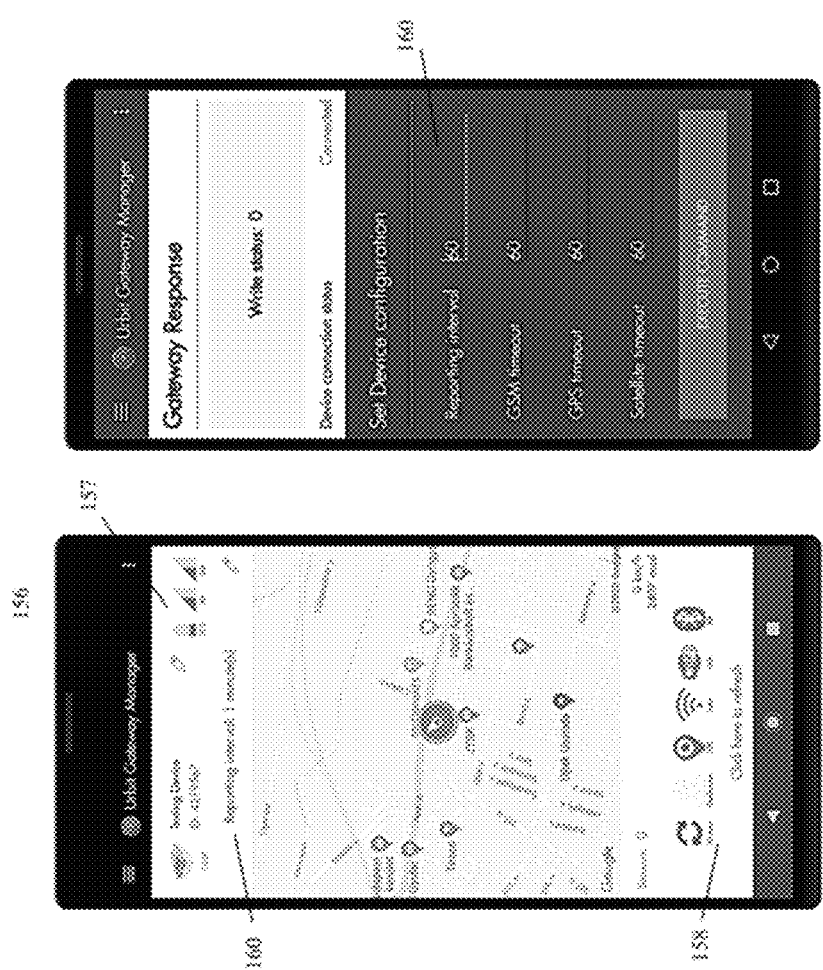

ns and sensors to help bring powerful storage and analytic capabilities, not present in the remote devices and sensors, to bring intelligence and decision making closer to the edge device, along with the ability to provision, update, and control access to devices connected to the system, as well as policy-based permissions. By allowing simple devices to bring to bear unprecedented intelligence and decision-making capabilities, the disclosed embodiments fuel the explosion in wirelessly connected mobile "things".

IOT GATEWAY DEVICE, SYSTEM, AND COMPUTER PROGRAM PRODUCT

TECHNICAL FIELD

The technical field of connection devices and/or links to the Internet of Things (IoT). In particular, an IoT gateway that aggregates data from wireless equipment and/or sensors, translates between its protocols, and processes their data before sending it to the Cloud for processing and presentation to the user.

BACKGROUND

The power that technology has developed to collect, transmit, store and analyze data makes it possible for us to apply all the power of computing and analysis to give greater intelligence to objects or things that are able to generate data and share it, as well as to take advantage of this intelligence to be able to modify and/or adapt their behavior according to the result of applying sophisticated algorithms to take advantage of the "knowledge" residing in multiple or similar objects. The technology in charge of these tasks is known as the "Internet of Things" (IoT).

The potential for the application of these technologies is barely within reach of our imagination, however, for this to be a reality there are several conditions that must be met, and which are listed below.

"Things" capable of directly or indirectly sharing your relevant information with some external equipment are required. These "things" capable of wirelessly sharing information will be generalized herein under "Devices and Sensors". Since, under many scenarios, it is not possible for these devices and sensors to deliver their data themselves over long distances, they require interconnection with intermediate equipment called "Gateways", i.e. Gateways carry information from a wireless networked system of equipment and sensors to and from the Gateway Cloud, while also taking care of the necessary inter-protocol conversions before sending it to the Cloud.

The importance of IoT gateways is understandable when you consider the explosion in connected "things" that has occurred in recent years. With a wealth of protocols, connectivity models, and power profiles, and the highly dispersed nature of IoT systems, gateways are needed to listen to these messages and transmit them to the Gateway Cloud to interpret, manage, and control these complex environments. As connected devices, protocols, and needs proliferate, it is often not possible to have components individually connected to the systems that use their data. Some sensors and controllers use very little power and, as such, do not support power-intensive protocols such as Wi-Fi™® or Bluetooth®, and therefore cannot be connected directly. Some edge devices generate so much data that, together, the data is overwhelming and not as valuable in its raw form.

IoT gateways must support a functionality, which the various embodiments disclosed herein resolves by means of reliable connectivity and security to ensure network and system integrity in both directions. A gateway must serve as a transparent protocol and data bridge between devices out in the field and the Gateway Cloud with the ability to translate and transfer data between systems operating under different communication protocols and data formats, which often require two-way communication capabilities. By transparently and efficiently connecting sensors and devices out in the field with the Gateway Cloud, the gateway enables the storage and processing of data away from the device or sensors to help bring powerful storage and analytic capabilities, not present in the remote devices and sensors, to bring intelligence and decision making closer to the edge device, along with the ability to provision, update, and control access to devices connected to the system, as well as policy-based permissions. By allowing simple devices to bring to bear unprecedented intelligence and decision-making capabilities, the disclosed embodiments fuel the explosion in wirelessly connected mobile "things".

In this sense, in the prior art there are no IoT gateways with the following functionality:
  Information exchange between the Gateway and the equipment and sensors that is done wirelessly and multifunctionally (meaning using various radios in a single embodiment).
  The Gateway makes no modifications to the received data and maintains the original encoding of the data that can only be decoded by the final receiver. The Gateway does not decode, interpret, or store the contents of received packets.
  It receives data from computers and sensors in its raw format to create the burst data packet and securely send it, already assembled, to the Gateway Cloud via the least expensive path.
  Its battery can be recharged wirelessly or by sunlight.
  The single embodiment is capable of sustaining the harshest outdoor conditions without the need for shelter or maintenance and is remotely managed and monitored.

Prior solutions necessarily use a non-redundant transmission medium and require protected outdoor and power conditions to serve proprietary or limited set of protocols for sensors and computers operating under geographical and motion restrictions. Therefore, there is a need in the art, to provide at least the following: 1) an IoT gateway in a single embodiment where the exchange of information between the device and the equipment and sensors is done wirelessly without making modifications to the data and protocol used by them; and 2) the data in its raw sensor format is assembled to create the burst data frame to send the assembled frame over the least expensive path to the Gateway Cloud, operating continuously in a plurality of standardized frequencies in or outdoors.

SUMMARY

The various embodiments contained in a single weatherproof enclosure of the various embodiments comprise: a wireless, self-powered IoT gateway device, a wireless networked system, method of use, and a computer program product, to preprocess and assemble the data frame of one or more wireless equipment or sensors (e.g. IoT) at the edge before sending it to the Gateway Cloud via one of up to five different network radio frequencies.

The IoT Gateway device may include the following: at least one processor, power source, memory; a global 3G SIM that automatically connects to the most available 3G cellular network when present; a L-Band satellite antenna designed to support the sending and receiving of data in the form of a burst; a high-precision multichannel GPS antenna; an IEEE antenna for WI-FI™ connection, according to 802.11b/g/n protocols; a Bluetooth® receiver that includes classic Bluetooth®, high-speed Bluetooth® and BLE (Bluetooth® low energy) protocols, and a LoRa® module designed to use LoRa® frequencies applicable at the gateway location and automatically configured by the device; an internal memory chip; and a Qi charger type, solar panel, and an internal battery that energizes all your electronic components. All equipment is controlled by a firmware that controls the behavior and functionality of the IoT Gateway device, which can be updated by air without opening or even being close to the device locally by a mobile application. This firmware applies the algorithms and policies that govern the operation of components and security of transmissions with other Gateways and other wireless media.

The disclosed system is designed precisely to drastically reduce the scenarios that prevent the disadvantages of the prior art, allowing the application of IoT technologies anywhere regardless of geographical location or authorized frequencies and GPS constellations at the device's location, for the following solutions (1-4). 1) the disclosed device may include a Gateway or Gateway type equipment called "IoT Gateway device", which integrates a variety of short, medium and long range wireless technologies to collect data from authorized equipment and sensors within range to send them to the Gateway Cloud using terrestrial or L-Band satellite wireless frequencies. 2) The solution includes a Cloud service called "Gateway Cloud" that listens, assembles, enriches, and prepares the information received by the Gateway for delivery to a standard IoT protocol manager. 3) The IoT Gateway device contains the algorithms to take the information to the Gateway Cloud, thus ensuring secure delivery based on the least cost routing and LoRaMesh criteria and encryption method. 4) The Gateway device uses the least cost routing and LoRaMesh criteria for the delivery of data from the Gateway device to the Gateway Cloud, using a combination of first 3G, WiFi™, then LoRa® networks and/or L-Band satellite.

The disclosed device may provide a gateway device for use with a variety of types of IoT sensors that receives the data, in its raw form from equipment or IoT sensors, and to create the encrypted short burst data frame to send the assembled frame, through the least expensive path, without modifying the original information received.

The disclosed device may provide a gateway for IoT that in the event medium and long range networks are not available, or no other gateway is available to handle the sending of data on its behalf, the gateway will temporarily save the data on an internal memory chip, until a network is available to send the information. Once sent, or in the event no network resulted available to send it, the information is permanently discarded.

The disclosed device may provide a gateway for IoT, whose internal battery can be charged wirelessly or by sunlight.

The disclosed device may provide a gateway for IoT that pre-processes, assembles and references geospatially (GPS) the data frame at the edge, before sending it to the Gateway Cloud over an available network, and using a least cost routing and LoRaMesh criterion. This geospatial stamp determines the exact location of the gateway from where the data was sent.

The disclosed device may provide a hybrid, wireless and self-powered IoT gateway that connects multiple equipment and sensors on land or sea through one or more Gateways or IoT Gateways or one or more terrestrial or L-Band satellite networks, is wireless and 100% autonomous in generating its own energy.

The disclosed device may provide the ability of a IoT Gateway device to link directly to another IoT Gateway device to create a chain of linked gateway devices that serves its purpose to find a gateway connected to Wi-Fi™ to reach the Gateway Cloud inexpensively using LoRa®. This becomes a de facto low-cost network which can extend miles due to the reach of LoRa® frequencies, following an algorithm illustrated in FIG. 5.

The Gateway or IoT Gateway device may consist mainly of a housing or a container designed to withstand, in the outdoors, extreme dust and water conditions, to the extent that the device can be submerged in up to a meter and a half of water for half an hour, without leaks into the internal electronics. This device housing or container lacks external component buttons that could be manipulated by an unknown person (e.g. out in field), thus forcing the use by the device owner of external mobile applications for monitoring and configuration, either wirelessly (BLE) or via the Gateway Cloud (L-Band satellite, 3G). The device further includes an airtight connector to an optional external power source, whether solar, wind or any source up to 24 volts in direct current.

The IoT Gateway device may include the following components: an Internal Solar Panel that serves as a power source for recharging the internal battery; a Printed Circuit Board (PCB) or card of the main electronic circuits; one or more microcontrollers, memory, radios that are housed among the other components; a Printed Antenna Circuit Card; Hosts antennas for 3G, L-Band satellite and GPS radios; a LoRa® Antenna; a Coil for electromagnetic wireless charging; a rechargeable battery; and firmware.

The LoRa® Antenna is located on one of the vertical walls of the housing or enclosure or container, by virtue of the characteristics of the spread of the LoRa® signal horizontally.

The Coil for electromagnetic wireless charging is fixed to the bottom of the container in order to minimize the distance to receive load from an external source located on the outside of the cabinet. The position is marked by the corresponding loading icon on the exterior of the enclosure.

The Rechargeable battery is in the lower part of the cabinet and fastened to avoid vibration or fall movements. It is the main source that powers the Gateway's power and is recharged by the internal solar panel, the coil for electromagnetic charge or an external power source, whether solar, wind or any source up to 24 volts in direct current.

The Firmware comprises computer code of instructions that control the behavior and functionality of the Gateway, which is in continuous development and can be updated by air without opening or even being close to the Gateway. The Firmware applies the algorithms and policies that govern the operation of components and security of transmissions with other Gateways and other wireless media.

The accommodation further comprises a chip that allows 3G cellular connectivity with frequencies UMTS/HSPA+ bands (800/850, 900, AWS, 1700, 1900, 2100 MHz), an L-Band satellite equipment that allows the sending of short burst data service (UMTS/HSPA+ bands (800/850, 900, AWS, 1700, 1900, 2100 MHz); a multichannel GPS antenna with an accuracy of 3 meters (GPS L1 1575.42 MHz); an IEEE module for Wi-Fi connection under the 802.11 b/g/n standard(2.4 GHz); a Bluetooth® BR/EDR and BLE specification receiver/transmitter (2.4 GHz), and a configurable LoRa® module array for the various globally authorized frequency ranges (Europe 868 MHz, India 866 MHz, North America 915 MHz, APAC 920 MHz, Asia 923 MHz) in different regions and an internal memory chip.

Method of use of the Gateway device comprises: 1) providing at least one Gateway device, comprising a housing storing a plurality of electrical components, comprising: i) a rechargeable battery; ii) at least one processor, and a flash memory; and iii) five independent telecommunications network components, comprising antennas and modules, comprising: WiFi™ ®, Bluetooth®, LoRa®, 3G cell phone GSM with associated SIM card, GPS, and L-Band satellite; 2) linking at least one IoT sensor to the gateway device; 3) wirelessly transmitting IoT sensor data to said gateway device using one or more of said network components of Wi-Fi™® (Wireless Fidelity), Bluetooth®, and/or LoRa®. 2; and 3) wirelessly transmitting data from the gateway device to the Gateway Cloud using one or more network components, comprising: 3G, Wi-Fi™ ®, LoRa®, and L-Band.

Once the Gateway device receives the sensor data from computers or IoT sensors, it wirelessly transmits it to the Gateway Cloud using a least cost routing and LoRaMesh methodology. The originating (first) gateway device tries to reach the Gateway Cloud using its own 3G radio frequencies. If this connection is not successful, then it tries to relay the data via WiFi™ frequencies to a connected broadband link. When the data is delivered successfully, then the gateway ends the data delivery cycle and returns to sleep mode without further action. If the gateway could not successfully deliver the data to the Gateway Cloud via Wi-Fi™, it then sends the data using LoRa® frequencies to all IoT Gateway devices in its range and waits for an acknowledgement for a predefined time while the satellite chip is initiated and gets ready to send the data using L-Band satellite frequencies. If an acknowledge is not received within the predefined wait time, then the first gateway device attempts to send the data via L-Band satellite frequencies. If the data was delivered successfully, then the gateway device ends the cycle and returns to sleep mode without further action. If the latter is still not successful, then the data is discarded and the gateway device goes back to sleep mode, until the next cycle when new data is received from the equipment or sensor. In the event a networked gateway device (second, third, etc.) sends its acknowledgement within the allotted time, then the originating first gateway device, upon receipt of this acknowledgement, ends its cycle and cancels any more attempts to relay or transmit the data. Now the networked gateway (second, third, etc.) starts a similar cycle of events as the one described above which, if not successful at the end, the data also ends discarded.

In an embodiment, the device may include a computer program product, e.g. a mobile application installed on a user device, comprising: a non-transitory computer-readable storage media and a device having computer-readable program instructions embodied thereon that when executed by a computer cause the computer to monitor and control the operation of one or more IoT Gateway devices remotely. The mobile application will display, for example, the gateway device's: geographic location, battery level, network utilized, etc.

The additional characteristics and advantages of the proposed various embodiments of the disclosed devices, systems, and methods should be more clearly understood by means of a nonlimiting example with reference to attached drawings.

BRIEF DESCRIPTION OF THE DRAWINGS

The above and other features, aspects, and advantages of the present disclosure will become better understood with regard to the following description, appended claims, and accompanying drawing herein.

FIG. 2A is a top perspective view of the IoT Gateway Device.

FIG. 2B is a bottom perspective view of the IoT Gateway Device before the four corner anchors are attached.

FIG. 2C is an exploded view of the device outer housing.

FIG. 2D is a bottom perspective view of the device with the four corner feet anchors attached, and the Qi rechargeable battery receiver symbol displayed.

FIG. 2E is a top perspective view of the device demonstrating one method of recharging the battery using a Qi charger beneath the Gateway device.

FIG. 3A is a top perspective view of the device's bottom container displaying the top layer antenna board comprising L-Band satellite, GSM, and GPS antennas, which are connected to the middle layer comprising antenna modules with additional electrical components (e.g. processor, Bluetooth® chip, part of the LoRa® antenna unit, etc.).

FIG. 3B is a top plan view of the middle layer motherboard comprising the IoT Gateway device main electrical components.

FIG. 3C is a longitudinal cross-sectional view of FIG. 3A taken along line 3C-3C illustrating the three layers of electrical components of the device in one exemplary embodiment.

FIG. 4C is another exemplary screen shot of a Gateway mobile app displaying the status of a Gateway device, comprising: device location, course, firmware version, GSM and L-Band satellite Signal strength, time elapsed since last successfully updated, geofencing, GPS, LoRa®, Wi-Fi™® and BLE connection status.

FIG. 4D is another exemplary screen shot of a Gateway mobile app the ability of the user to set the Gateway device's network reporting, or data transmission intervals for the networks.

FIG. 6A is a table for the Oil and Gas industry, and the Agriculture industry and the types of sensors used with the system of the present invention.

FIG. 6B is a table for the Agriculture (e.g. vineyard) industry, ATM Payment Industry, Sports Field Industry, and Tracking Industry and the types of sensors that can be used with the system of the present invention to transmit sensor data cost effectively to a cloud account.

DETAILED DESCRIPTION OF EXEMPLARY EMBODIMENTS

Figure 1A:
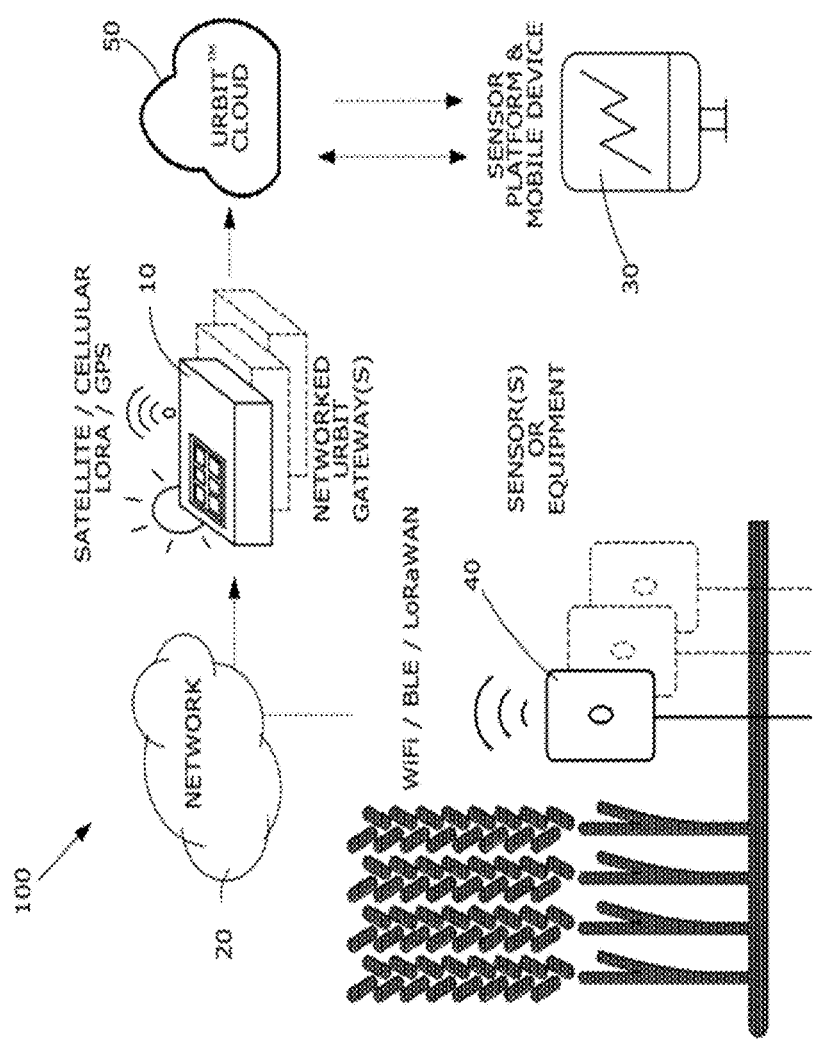
FIG. 1A is an illustration of an exemplary networked system for using the IoT Gateway device and mobile application to monitor agriculture conditions.

It is to be understood that this disclosure is not limited to particular embodiments described, as such may, of course, vary. It is also to be understood that the terminology used herein is for the purpose of describing particular embodiments only, and is not intended to be limiting, since the scope of the various embodiments will be limited only by the appended claims.

Where a range of values is provided, it is understood that each intervening value, to the tenth of the unit of the lower limit, unless the context clearly dictates otherwise, between the upper and lower limits of that range is also specifically disclosed. Each smaller range between any stated value or intervening value in a stated range and any other stated or intervening value in that stated range is encompassed within various embodiments. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in various embodiments.

And although any methods and materials similar or equivalent to those described herein can be used in the practice or testing of the various embodiments, some potential and preferred methods and materials are now described. All publications mentioned herein are incorporated herein by reference to disclose and describe the methods and/or materials in connection with which the publications are cited. It is understood that the present disclosure supersedes any disclosure of an incorporated publication to the extent there is a contradiction.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

As used herein, the term "Gateway Cloud" refers to the set of solutions and technological infrastructure, software and hardware, capable of receiving the data delivered by the Gateway(s) obtained from the system Equipment and Sensors, and applies algorithms that leverage and accumulate the data received. The application of these steps requires for its success certain conditions for a successful transfer of information, in that the equipment and sensors must have a means to deliver and receive information to and from the Gateway Cloud, regardless of geographic location and the Gateway or Gateways must be able to operate without geographical restrictions, automatically adjusting the transmission and reception frequencies to the applicable jurisdiction, based on the invention's location. The Gateway(s) use a multitude of different sensors in a given application and thus must standardize all differences in the data frames by using a common language that allows it to build each data frame without modifying the original information, weather encoded or not, to communicate with the Gateway Cloud in a ubiquitous and secure manner, applying algorithms that allow it to ensure the secure delivery of the message by any means available. Also, for it to operate in underserved locations, the Gateway is completely self-sufficient in its energy generation and telecom infrastructure and can be remotely updated and monitored. Once the Gateway Cloud has processed the sensor and equipment information, the Gateway Cloud transfers the standardized information to the various applications by using an Internet connection at the Gateway Cloud to reach other accessible servers, where the various sensor applications reside, and which are beyond the control of the Gateway Cloud. A distinction is thus made between the Gateway Cloud, where sensor data is delivered by the various networks available to the IoT Gateway and the Cloud itself in that the Gateway Cloud connects to other Clouds via Internet which no longer form a part of the Gateway Cloud. As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "computer executable code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

As used herein, the term "Software" or "Computer Program Product" refers to computer program instructions adapted for execution by a hardware element, such as a processor, wherein the instruction comprises commands that when executed cause the processor to perform a corresponding set of commands. The software may be written or coded using a programming language and stored using any type of non-transitory computer-readable media or machine-readable media well known in the art. Examples of software in the various embodiments comprise any software components, code, modules, programs, applications, computer programs, application programs, system programs, machine programs, and operating system software. The software, or computer program product is installed within memory on a computing device.

The term "QR code" refers to Quick Response code comprising a matrix barcode scanned by the camera on a user's electronic computing device (e.g. smartphone). The QR code image contains data for a linking or pairing a specific Gateway device 10 to a mobile application 42.

As used herein, the term "the Internet of Things or IoT or IoT system", refers to the plurality of equipment, sensors and devices that are connected to the gateway and that is used to send or receive information from these. Any equipment, sensor or device that conforms to the international standards of each technology, can be connected to the gateway via Wi-Fi™, BLE or LoRaWAN™. The number of connected edge devices is limited only by the number of bytes used to identify each sensor individually and the size and complexity of the sensor payload, as well as the characteristics of the media used.

The IoT Gateway is a single hardware composed of multiple PCBs hosted in an enclosure or container or housing where the firmware also resides for proper operation. The IoT gateway of the various embodiments is a physical device in the figures associated with a local software program (firmware) and other remote software (Gateway Cloud) that serves as an endpoint between the Cloud, where their corresponding applications reside, and equipment, sensors and devices. The IoT Gateway provides a place to preprocess and assemble the data frame at the edge, the Gateway Cloud, before sending it to the Cloud. The IoT gateway device and/or networked system of the various embodiments performs several critical functions, such as device connectivity, protocol translation, data filtering and processing, security, updating, management, and more. For data transfer of any services to the Cloud, the gateway uses a middleware server in the Gateway Cloud, which receives the message, authenticates it, enriches it, and translates it to a Message Queuing Telemetry Transport (MQTT) protocol, which is one of the most commonly used protocols in IoT projects. In addition, it is designed as a lightweight messaging protocol that uses published/subscribed operations to exchange data between clients and the server. MQTT, likewise, is a publication-based messaging protocol, subscription standard in ISO (ISO/IEC PRF 20922) that works over TCP/IP protocol. It is designed for connections to remote locations where a "small code footprint" is required or a network bandwidth is limited.

The MQTT-SN protocol uses UDP and not TCP for transport. UDP is an offline protocol, while TCP is connection oriented. In that sense, the MQTT-SN protocol generally does not require a connection to the broker before it can send and receive messages.

The IoT gateway connects to five independent telecommunications networks and the Global Positioning System) (GPS) network, three coverage networks, planned to collect data transmitted by equipment and sensors or networked gateways, and two wide/global area coverage networks to send information to the Gateway Cloud using a least cost routing and LoRaMesh criterion.

The terms LoRaMesh and least cost routing criterion, as used herein, are described as follows:

Least cost routing is the preferred utilization of a network radio such that, when available, provides a comparatively lower cost alternative, in comparison to all other networks available to the Gateway, to send a given amount of information to the Gateway Cloud. Typically, the order of preference from lowest to highest cost is 3G cellular, then WiFi™ when an Internet connection is available to the Gateway and thus becomes a viable alternative to send information to the Gateway Cloud, and lastly L-Band satellite. The hierarchy of preference can be defined for each particular Gateway in order to respond to specific circumstances used in the LoRaMesh algorithm, like for example when it is known that cellular is not available under any circumstance, like in the middle of the ocean, then its preference can be changed to optimize the LoRaMesh algorithm decision making process. LoRa® is used solely to receive data from sensors and to establish links to relay sensor data from one Gateway to another, hoping to achieve a lower cost data path to the Gateway Cloud. This hierarchy allows the Lora Mesh, as described below, to relay information from one Gateway to another to achieve the use of a preferred network, when not available to the original Gateway.

Therefore, the IoT Gateway is a hybrid, wireless, and self-powered gateway that connects multiple equipment and sensors on land or sea through one or more Gateways or IoT Gateways or one or more terrestrial or L-Band satellite networks to provide wireless and global coverage in a reliable and secure network connectivity. It is wireless and has nearly 100% autonomy due to its self-powered solar recharge technology.

The main functions of the gateway for IoT are as follows. 1) It collects information from equipment and sensors through Wi-Fi™, BLE and/or LoRa®/LoRaWAN™ connections. 2) It temporarily stores, compresses, and simplifies the collected data. 3) It complements the collected data with Geolocation information, schedule and data specific to the Gateway or Gateway operation. 4) It transmits such data as they arrive, or in predefined, configurable, and secure periods and under a least cost routing and LoRaMesh strategy, to a central server (Gateway Cloud) that expands, complements, and forwards to the Cloud. 5) It receives messages that are queued to the Gateway Cloud, from the Cloud, to perform update processes, configurations and/or extraordinary requests for data reports.

Networked System Architecture

FIG. 1A is an illustration of the networked system 100 of the various embodiments comprising: 1) an IoT Gateway Device 10; 2) a wireless network 20; 3) a user's mobile electronic communications device (e.g. a smartphone with a mobile application of the various embodiments installed thereon) and data gathering and statistical analysis platform 30; 4) one or more Internet of Things (IoT) sensors or equipment 40 able to collect local data from the local environment for secure storage; and 5) a remote, secure Cloud storage and data processing server 50 (e.g. the Gateway Cloud).

Figure 6A:
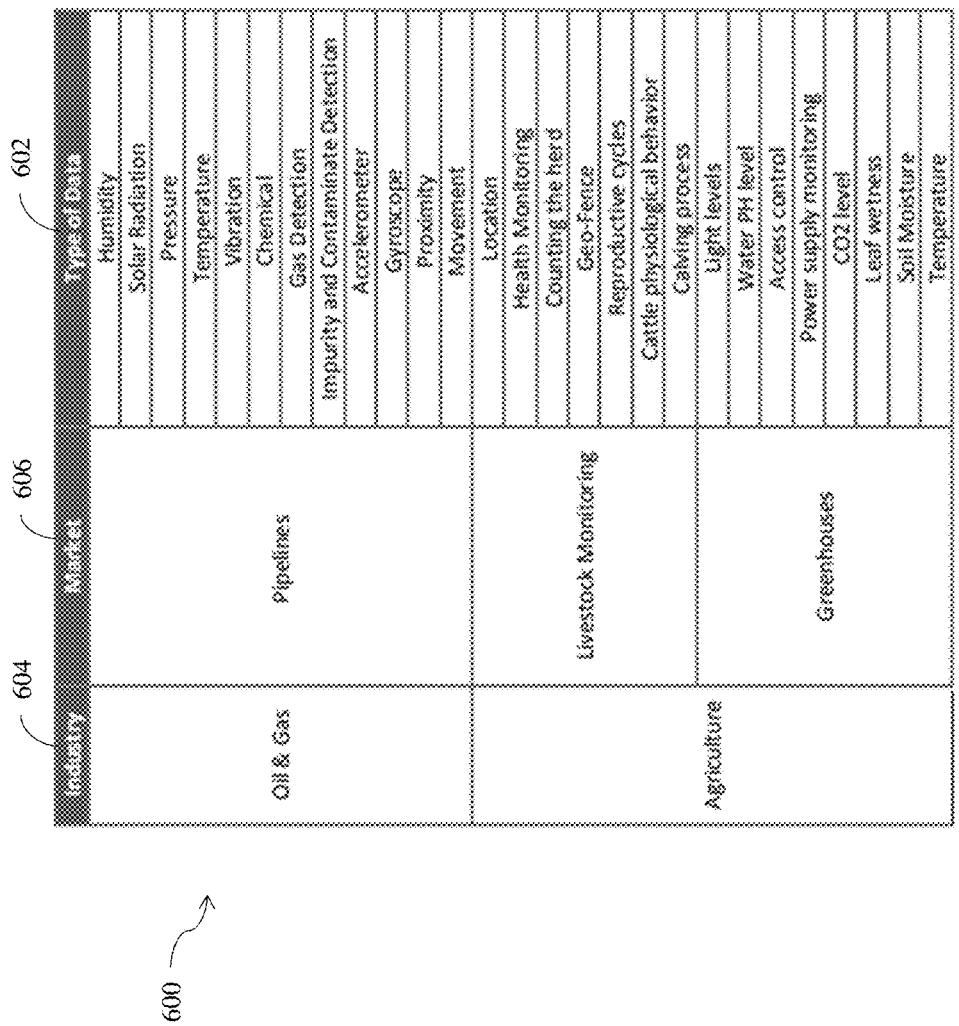
FIGS. 6A and 6B show a table describing examples of different types of data from sensors which may be used by different industries in different markets.
Figure 6B:
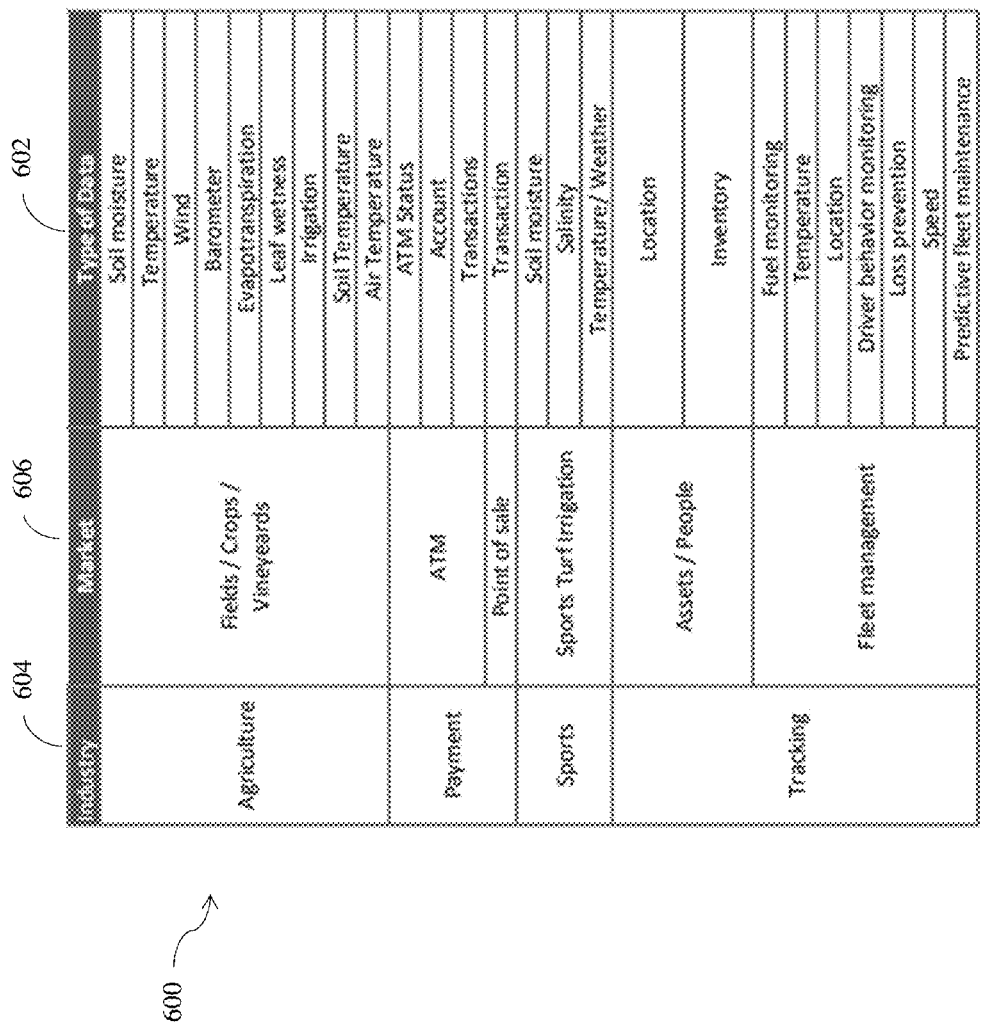

IoT Sensors and Equipment 40: the various embodiments comprise using the Gateway device 10 with a variety of types of IoT sensors, as listed in FIGS. 6A and 6B. FIGS. 6A and 6B are enunciative of the types of sensors or equipment compatible, however any sensor which utilizes the standardized range of frequencies of any of the networks used by the IoT Gateway to connect with them can successfully operate, independent of the protocol or encryption methods utilized by its manufacturer.

A "User Electronic Computing Device" 30 refers to any electronic device comprising a central processing unit (i.e. processor) with the ability to transmit and receive electronic communications comprising via Internet and/or cellular connectivity, such as a laptop or desktop computer, a tablet, a smartphone, a personal digital assistance (PDA) device, etc.

Figure 1B:
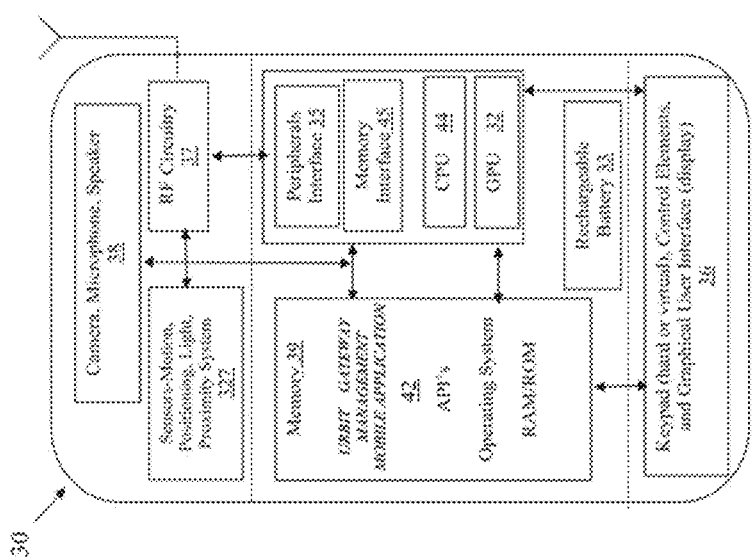
FIG. 1B is a block diagram of a user mobile electronic device (e.g. a smartphone) having installed or accessible via a wireless network, the non-transitory computer readable storage media (i.e. the mobile application) used to control the gateway device (e.g. the IoT Gateway mobile application).

An exemplary illustrated in FIG. 1B, the user electronic computing device 30 (e.g. smartphone, laptop, tablet, etc.) further comprises the following components: memory 39 with an operating system (e.g. Android®); central processing unit (CPU) 44 graphical processing unit (GPU) 32; peripherals interface 35 to facilitate IoT sensor monitoring, camera, microphone and speaker communications 38; radio frequency (RF) subsystem 37 to wirelessly transmit IoT sensor data and images, or other wireless communications; and one or more means of inputting user data 36 using a touchscreen or pointer (e.g. keypad-hard or virtual; control elements; GUI; etc.); and a rechargeable battery 33.

Memory 39 has installed therein the IoT Gateway Mobile Application/Module 42 of the various embodiments, which may further comprise the use of application program interfaces (API's). The memory 39 or other data storage unit (e.g. the Gateway Cloud 50) stores data, such as IoT sensors' data.

Additionally, memory 39 (which may include one or more computer readable storage mediums) also comprises high-speed random access memory and may also include non-volatile memory, such as one or more magnetic disk storage devices, flash memory devices, or other nonvolatile solid-state memory devices. Access to memory 39 by other components of the device 30, such as the CPU 44, may be controlled by a memory controller 45.

The RF (radio frequency) subsystem 37 receives and sends RF signals by converting electrical signals to/from electromagnetic signals and communicates with communications networks and other communications devices via the electromagnetic signals. The RF subsystem comprises well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF subsystem communicates with network 20, such as the Internet, an intranet and/or a wireless network, such as a cellular telephone network, a wireless local area network (LAN) and/or a metropolitan area network (MAN), and other devices by wireless communication.

In a particular embodiment, network 20 comprises one or more of: LoRaWAN™, Wi-Fi™ and/or BLE (Bluetooth® Low Energy). In an embodiment, network 20 comprises a series of IoT Gateway Devices 10 linked in series to another device 10 that has a Wi-Fi™® network connection in order for the system (FIG. 1, 100) to reach the Gateway Cloud storage and data processing capabilities inexpensively using LoRa®™. Hence, the various embodiments provides a de facto inexpensive wireless network 20 to connect over extended miles a plurality of IoT Gateways 10, IoT sensors 40, and transmit data between them and platform 30 and the Gateway Cloud storage and data processing facility 50 using a LoRa® network.

Gateway Cloud storage: in an exemplary embodiment, the cloud connectivity, storage and data processing is via the Gateway Cloud. Data is stored securely when the IoT Gateway Device 10 compresses and encrypts all of the data before transmitting it to the corresponding Gateway Cloud account, where it is stored, processed and made accessible from a user's electronic computing device 30, e.g. smartphone.

In an embodiment, the Cloud is referred herein to as "the Gateway Cloud". IoT Gateway device 10 has its counterpart server located in The Cloud. This component listens to, assembles, expands, and completes messages received from Gateways, and serves as an intermediary for translating, sending, and receiving messages with an MQTT agent.

The Gateway Cloud also has a series, extensible and adaptable of programs, called "backends", that subscribe and publish messages to and from MQTT topics, to serve as an intermediary with the platforms of the manufacturers of the equipment and sensors, responsible for processing the messages originated therein. In this way the Equipment or Sensor communicates with its own platforms, leaving the Gateway as a "transparent" participant, which only intervenes to deliver the messages to their destination.

Third party equipment and sensors 40 can be connected to the gateway device 10, or vice versa, using one of the three active wireless networks on it, e.g.: BLE 1510, Wi-Fi™ 1520, or LoRa®//LoRaWAN™ 1530, on a connection: it is established to send and at the termination of data send is disconnected. This connection strategy is used to save and allow other equipment and sensors to transfer their data.

Similarly, the Gateway device 10 makes no changes to the data received from equipment and sensors but enriches them with geolocation data and date/time information, compacts and ciphers it. It receives the data, in its original format, from the computer or sensor and creates the short burst data frame to send the assembled frame over the least expensive path. The Gateway options for the transfer of information to the Gateway Cloud are, as the first option, the cellular 3G network, if it is not available it will attempt to send through the Wi-Fi network to a broadband link, if unsuccessful, will use the LoRa® network to connect to another Gateway, and, if none of the above networks are available, the use of the L-Band satellite network will be attempted. In the event neither the cellular network, Wi-Fi network, nor the LoRa® network, nor the L-Band satellite network is, available, the data is discarded, and the gateway goes to sleep.

Additional significant advantages of the various embodiments comprise the following. It supports multiple radios (Wi-Fi™, Bluetooth®, BLE, LoRa®, 3G cell phone and L-Band satellite) that can operate simultaneously and without interfering with their radio frequencies. It has a processing capacity within the Gateway device with a versatile firmware that can carry intelligence close to the sensor, thus avoiding transmissions or time wasting and that can be configured remotely. The Gateway device has its own intelligence to summarize and/or compact the collected information before sending it to the Gateway Cloud, which can be managed and updated remotely; and to rearm messages before being sent to other servers in the Cloud. One Gateway device has the ability to search and transmit to another Gateway device, within range, that can take data back and forth to the Gateway Cloud (Gateway meshing function on a network). And one Gateway device has security protocols for the authentication of other Gateways or equipment and sensors as well as for the protection of the information sent; and the autonomy for its operation with a rechargeable power supply. It also has globally single configuration, with automatic ability to adjust legal frequencies for wireless cellular and LoRa® operation according to its geographic location. And it can be configurable and upgradeable from the Gateway Cloud, allowing the Gateway or Gateways to operate unattended in the field.

The device housing is resistant to extreme weather conditions such as rain, dust, heat or cold. The user does not require any intervention and there are no physical elements that can be manipulated in the gateway container. A mobile device application links to the device using BLE technology to query, manage, configure, and update.

IoT Gateway Device

In various embodiments disclosed herein, as illustrated in FIGS. 2A-3D, the various embodiments comprises an IoT Gateway Device 10, or herein also known as the IoT Gateway device 10, or device 10, comprising in an exemplary embodiment the following components primary housing 60 components: a top lid 62; a bottom container 64 housing the majority of the electrical components 90; and a middle airtight seal bar 69 between the two. Bar 69 and housing 60 prevents damage to the inner electrical components 90 from exposure to weather and outdoors, e.g. extreme dust and water conditions, to the extent that device 10 can be submerged in up to a meter and a half of water for half an hour, without leaks into the internal electronics.

In an exemplary embodiment, electrical components are arranged in container 64 in three stacked layers of circuit boards, but other arrangements are envisioned within the scope of the various embodiments.

IoT Gateway device 10 comprises a substantially rectangular shaped top lid 62 and bottom container 64. Device 10 in an exemplary embodiment further comprises the dimensions such as about: 18.0 cm (L)×·12.0 cm (W)×6.05 cm (H). It is noted that other sizes and shapes of the IoT Gateway device 10 are also envisioned within the scope of this invention. Lid 62 may further comprise: a solar panel 80; light emitting diodes (LED) as indicators of device status, e.g.: on, off, malfunction, low battery, offline, low signal, etc.

Figure 2A:
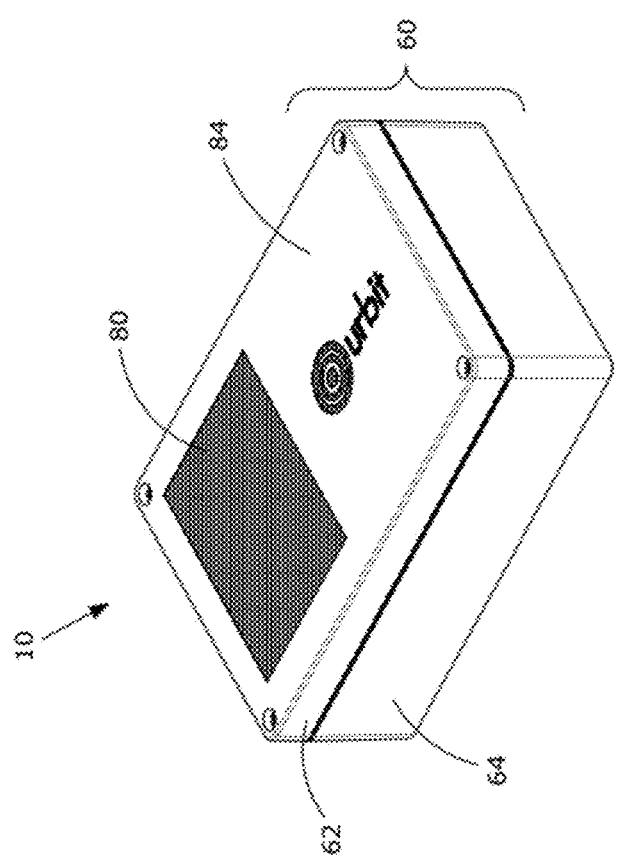
FIGS. 2A-2E comprise views of the outer housing of the IoT Gateway device.
Figure 2B:
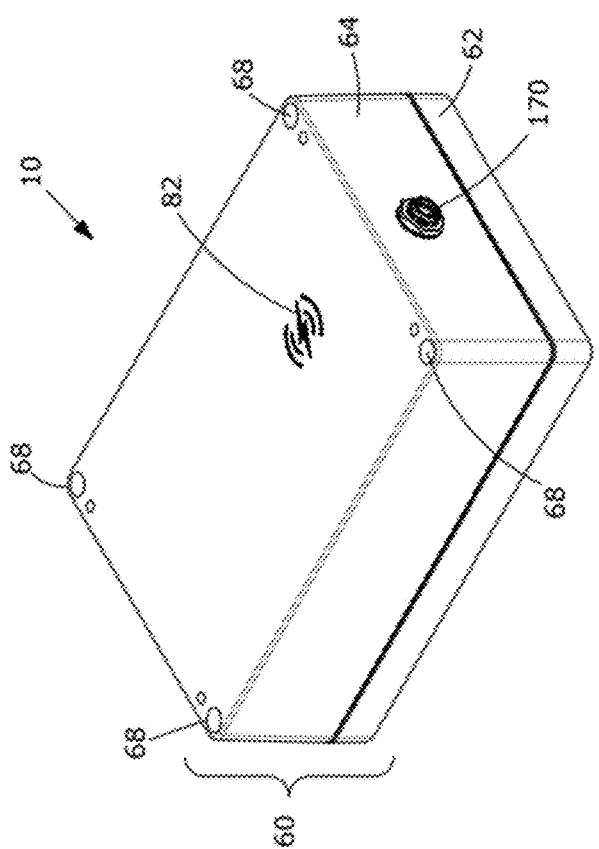
Figure 2C:
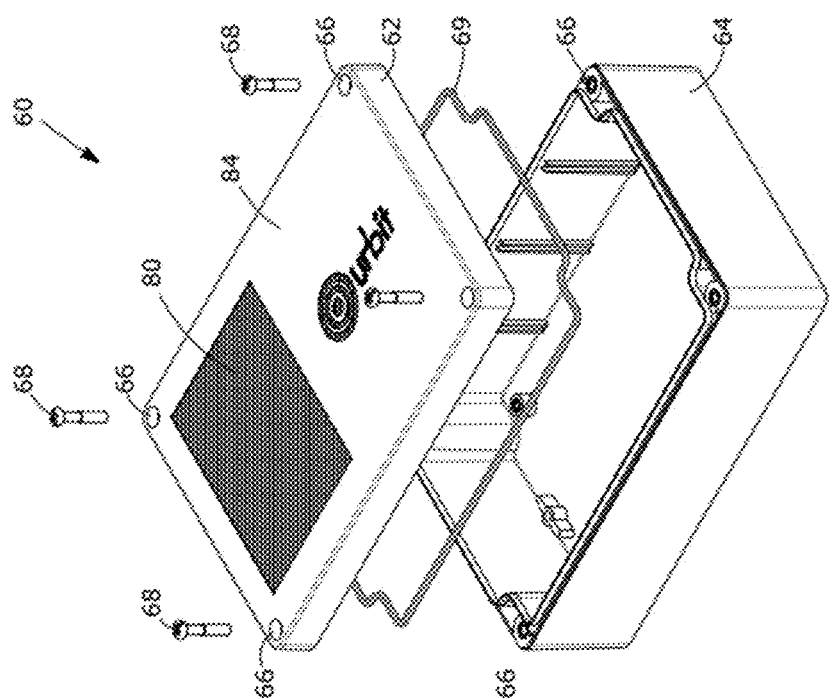

As illustrated in FIG. 2C, IoT Gateway device 10 may further comprise a middle airtight thin bar 69 positioned between lid 62 and container 64 to seal the connection between the two, such as to prevent moisture and dirt from entering device 10 to damage the electrical components within. The IoT Gateway device 10 further comprises four screw holes 66 extending through lid 62 and into bottom container 64, permitting screws 68 to secure the lid to the bottom container 64. Other mechanisms for securing the lid and bottom container together in a secure manner able to withstand all weather conditions is well within the knowledge of one of ordinary skill in the art.

Figure 2D:
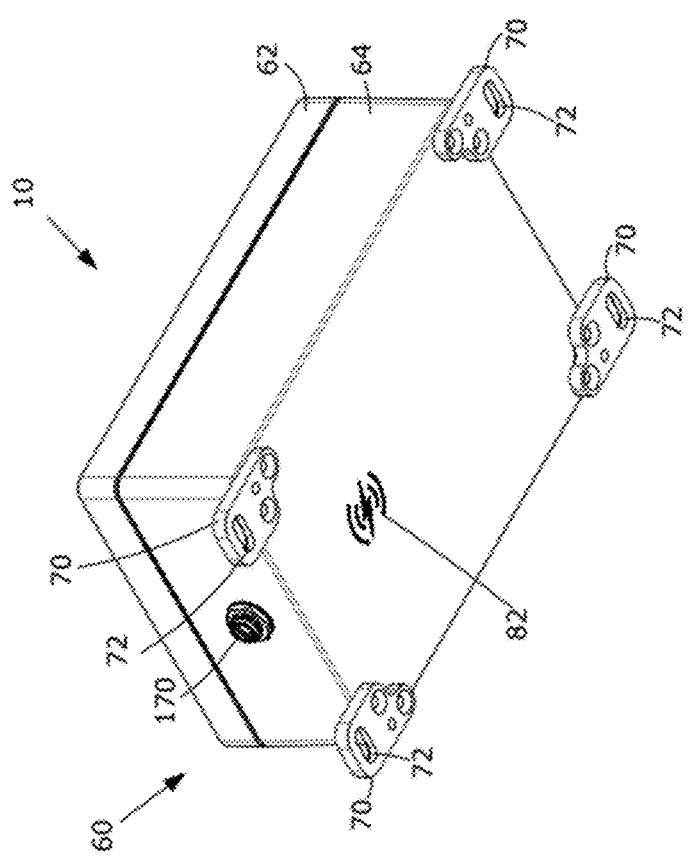
Figure 2E:
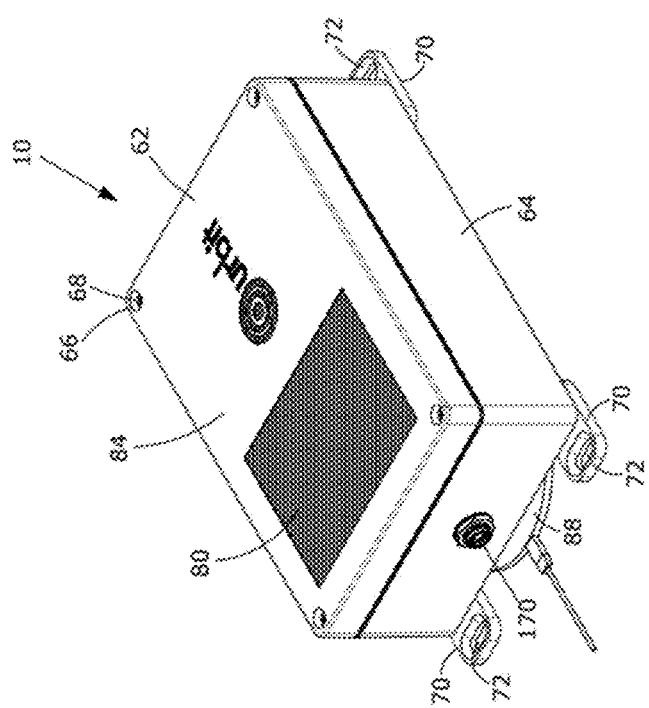

As illustrated in FIGS. 2D and 2E, IoT Gateway device 10 further comprises in embodiments four corner bottom mounted feet 70 with hanging holes 72 with adjustment and fixing slots configured to place and secure the IoT Gateway 10 on any desired surface either indoors or outdoors and on land or sea, such as in an agriculture field.

Figure 2F:
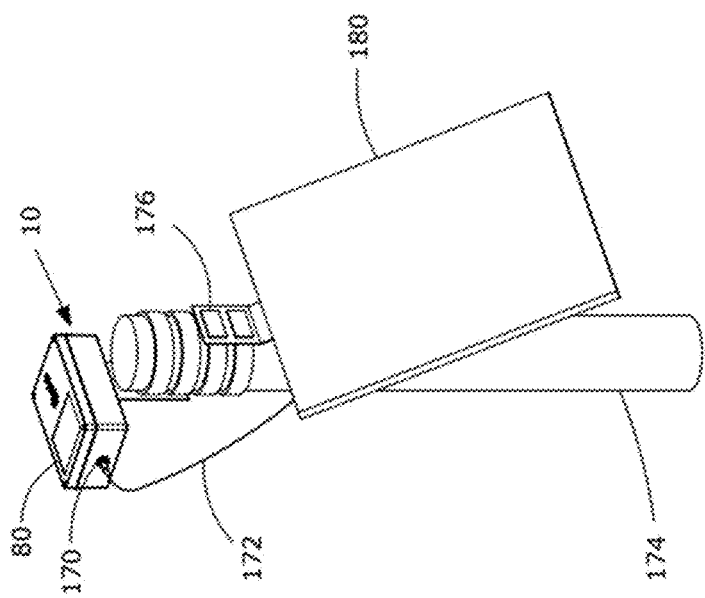
FIG. 2F is a perspective view of a gateway device in an environment of use, mounted atop a pole, and connected to an external second solar panel, which is significantly larger than the solar panel embedded in the gateway device lid.

In an embodiment as illustrated in FIGS. 2B, 2D-2F, gateway device 10 further comprises a power connector 170 extending from the electrical components 90 within the housing, through a housing sidewall. An external power source is attachable to the device via connector 170. For example, FIG. 2F is an illustration of an exemplary embodiment of the gateway device 10 positioned on top of a pole 174 and secured using brackets 176. Cable 172 runs from connector 170 to the external solar panel 180. It is noted that the external power source can also comprise a variety of devices, such as by way of non-limiting examples: a vehicle battery, a wind turbine, a wall outlet, etc.

Temperatures: Operating Temperature of the IoT Gateway device 10 is in the range from about −40° C. a +60° C.; and Storage Temperature Range from about −50° C. a +85° C. The gateway has an internal temperature sensor to prevent the continued use under out of range temperatures. Once temperature returns to normalcy, the electronics resume its operation automatically.

In an embodiment, the weight of the IoT Gateway 10, in an embodiment, is about 750-800 grams, such as 791 grams.

Figure 3A:
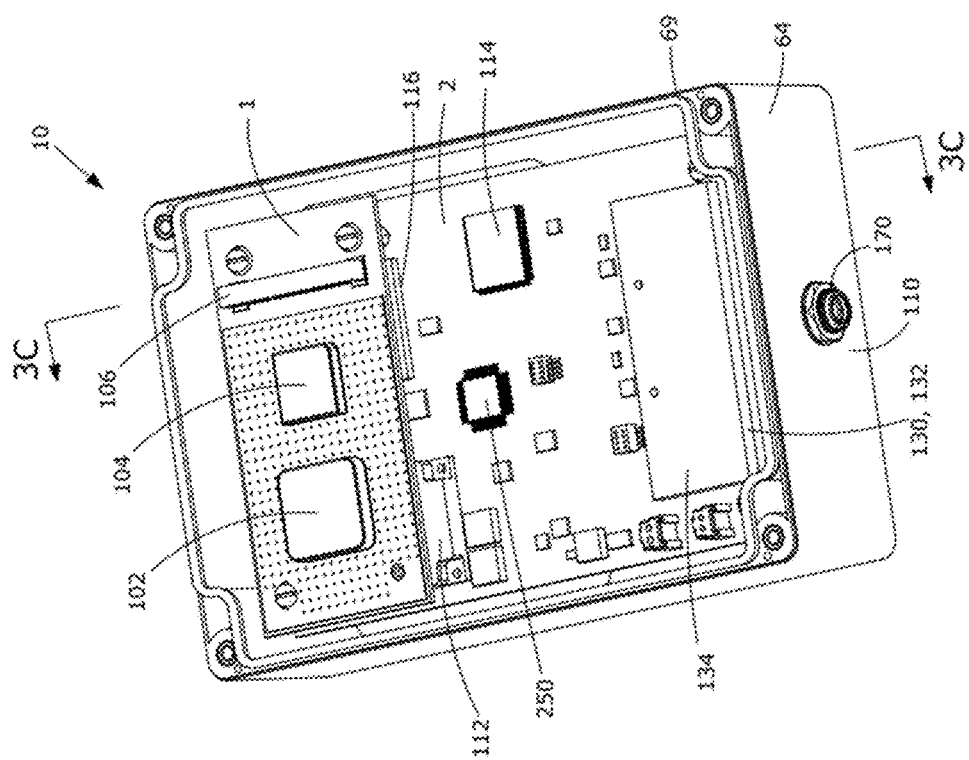
FIGS. 3A-3C are illustrations showing three stacked layers of the electrical components within the gateway device outer housing.
Figure 3B:
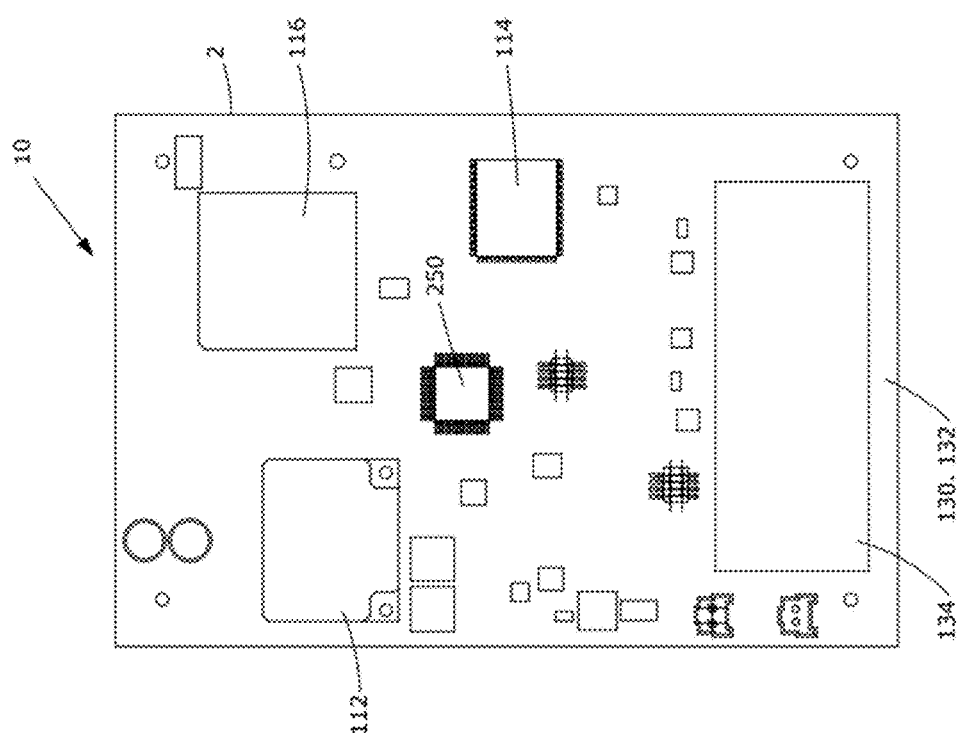
Figure 3C:
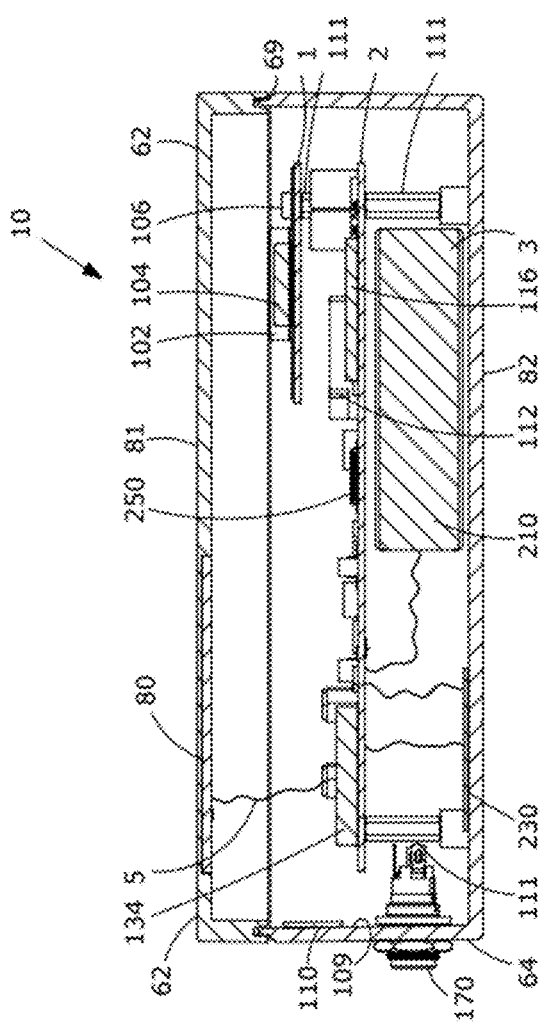

FIGS. 3A-3D are printed circuit board schematics illustrating the electrical components 90 within and on the device. FIG. 3C is the bottom container in a longitudinal cross-sectional view 64 displaying the three stacked, layers within containing, from top to bottom: 1, 2, 3. The layers are fixed in position using spacers 111 vertically positioned between layer 1 and 2 (15 mm spacer), and between layer 2 and the bottom surface of the container (20 mm spacer).

Antennas: top layer 1 comprises a plurality of antennas enabling wireless communication between at least one IoT sensors (FIG. 1, 40) and the Urbit™ device 10, comprising one or more of, for example: L-Band satellite antenna 102; GPS antenna 104; and GSM cellular antenna 106. Middle layer 2 comprises the chips that the antennas of layer 1 are connected two (wires not shown): L-Band satellite chipset 112; GPS chipset 114; and Wi-Fi™® chipset 116. The GSM antenna 106, which includes a global 3G SIM card (FIG. 3D, 120) that can be used anywhere in the world to automatically connect to the most available carrier.

Thus IoT Gateway device 10 hosting comprises five independent telecommunications networks, three networks (BLE, Wi-Fi™®, LoRaWAN™), planned to collect data collected by equipment or sensors, and two wide/global area coverage (L-Band satellite and Cellular) to send the information to the Gateway Cloud using a least cost routing and LoRaMesh criterion. LoRaWAN™ is also used to connect other gateways within reach in order to obtain a least cost routing and LoRaMesh path when the gateway is wirelessly connected to the Cloud via an inexpensive Internet connection, eliminating the need for cellular or L-Band satellite alternatives which may prove more costly. Other future network types are contemplated.

Bluetooth® Low Energy (BLE), which is made up of a Bluetooth® receiver that includes classic Bluetooth®, high-speed Bluetooth® and low-power Bluetooth® protocols, has a maximum coverage of three to 10 meters. The BLE is a personal area network planned to connect, with low power consumption, devices within its range of coverage in a low-cost network.

Figures 4A, 4B:
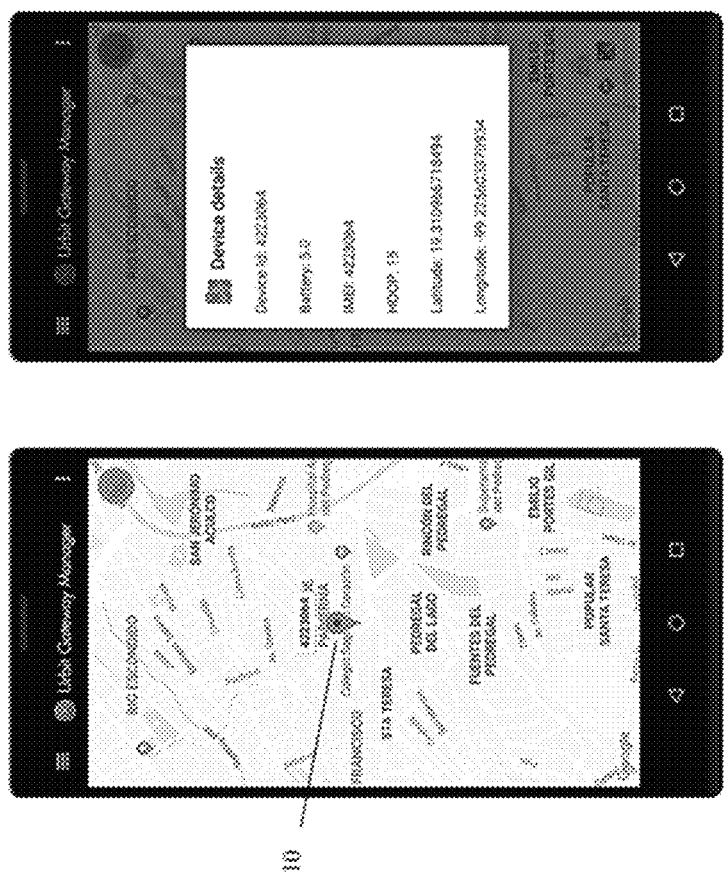
FIG. 4A is an exemplary screen shot from the computer program product, e.g. a mobile application displaying a Gateway device location on a map.
FIG. 4B is another exemplary screen shot of a Gateway mobile app displaying characteristics when the device of FIG. 4A when selected, e.g.: battery level, latitude and longitude.

The IoT Gateway device 10 uses the Bluetooth® and low-power Bluetooth® frequencies with an IoT sensors 40 that use this technology and to wirelessly connect to an Android/iOS device where the mobile application is installed (e.g. FIG. 1B, 42; FIGS. 4A, 4B) and authorized via QR code to manage gateway settings locally.

Wi-Fi™, consisting of an IEEE antenna with a transmission speed of 54 Mbps up to 600 Mbps, which has support for 802.11 b/g/n/e/i (802.11n×2.4 GHz up to 150 Mbit/s), the WiFi™ is configured to collect data from equipment or sensors and other devices within its coverage (up to 40 meters), acting as an access point and DHCP server to do that.

Figure 3D:
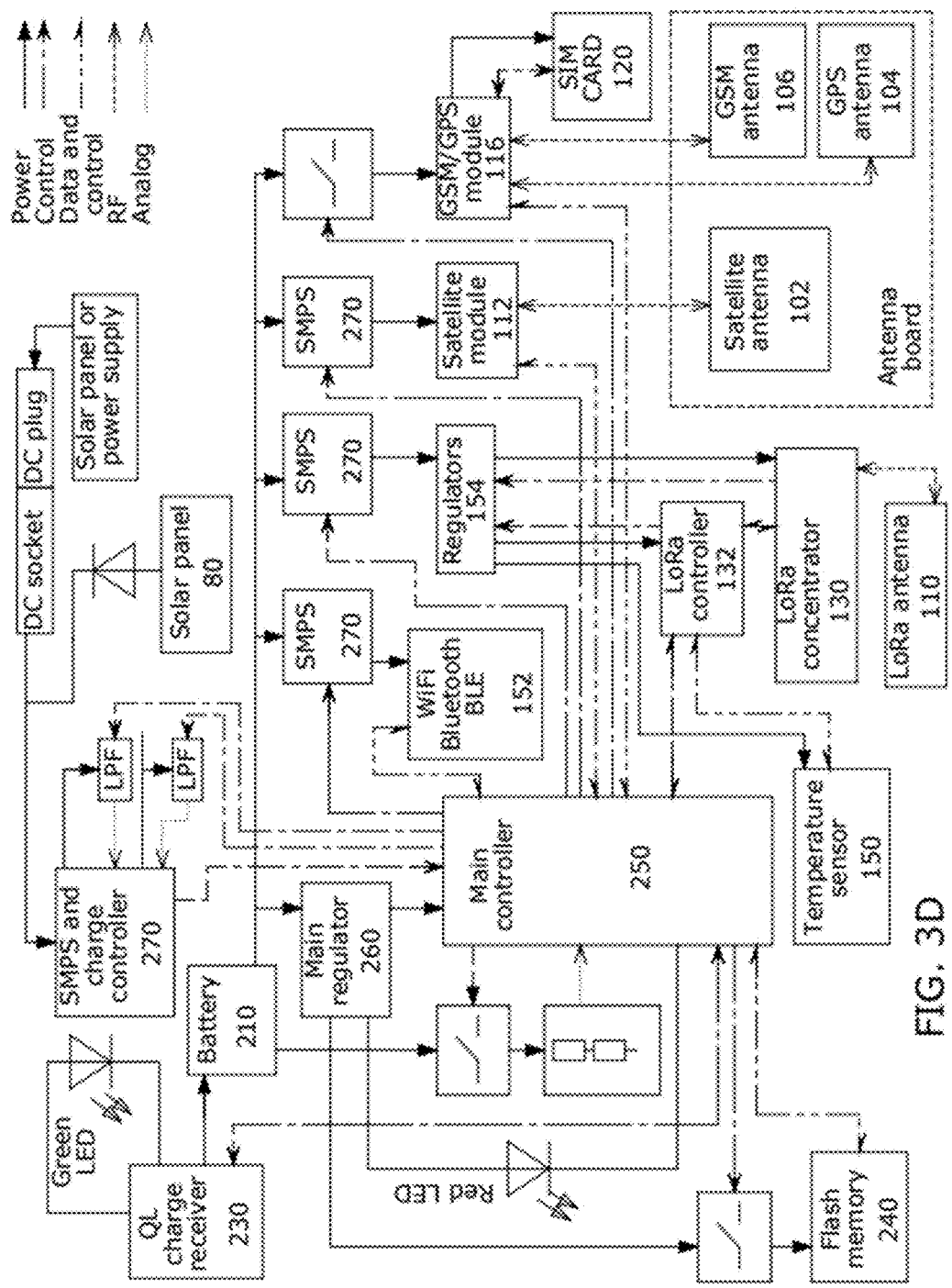
FIG. 3D is a schematic of an electrical diagram comprising all of the primary components of the gateway device's three stacked layers.

As illustrated in FIG. 3D, the various embodiments comprise three LoRa® components to allow sequential connection of IoT Gateway 10 devices: LoRa® antenna 110; LoRa® concentrator 130; and LoRa® controller 132. In an embodiment, the LoRa® components 130 and 132 are located beneath the radiofrequency shield (FIG. 3A, 134) on layer 2; and the LoRa® antenna 110 is on the inside wall 109. As illustrated in FIG. 3D, the LoRa® components further comprise, in an embodiment, a temperature sensor 150, and a regulator 154.

A primary characteristic of the various embodiments is its ability to deliver the data received by computers or sensors to the Cloud using a least cost routing and LoRaMesh methodology. To accomplish this, once the gateway has received the sensor data, first tries to reach the Gateway Cloud using its own 3G radio frequencies, if this connection is not successful, then it tries to relay the data via Wi-Fi™ frequencies to a connected broadband link, however, if the 3G connection is successful, the Gateway ends the data delivery cycle and returns to sleep mode without further action. If the gateway could not successfully deliver the data to the Gateway Cloud via Wi-Fi, it then sends the data using LoRa® frequencies to all IoT Gateway device in its range and waits for an acknowledgement for a predefined time while the satellite chip is initiated to be ready to send the data using L-Band satellite frequencies. If an acknowledge is not received within the predefined wait time, then the original gateway attempts to send the data via L-Band satellite frequencies. If the data was delivered successfully via satellite, then the gateway ends the data delivery cycle and returns to sleep mode without further action. If the latter is still not successful, then the data is discarded and the gateway goes back to sleep mode, until the next cycle when new data is received from the equipment or sensor. In the event the originating gateway does receive an acknowledgement within the predefined wait time, the satellite transmission is not performed, and the gateway ends its cycle and returns to sleep mode without further action. Now the networked gateway, which received the relayed information from the originating gateway via the LoRa® frequencies, starts a similar cycle of events as the one described above which, if not successful at the end, concludes with the data also being discarded. This characteristic can create a network architecture using a series of networked IoT Gateways interconnected to reach the Cloud using an inexpensive medium like a public broadband wireless Internet connection present in one of the networked gateways. This de facto inexpensive network can extend several miles, due to the propagation characteristics of the LoRa® frequencies to link several networked IoT Gateways which relay the data to ultimately connect to the Cloud using the lowest cost route. This feature can potentially resolve the lack of communication in remote and underserved areas to allow sensors and devices anywhere in the world to share their data to the Cloud using a series of networked gateways and at a very low cost.

LoRaWAN™, consisting of a LoRaWAN™ 1.0.1, Class A antenna, which supports the EU863-870 MHz, US 902-928 MHz, AU 915- . . . 928 MHz, AS 923 MHz, IN 865-867 MHz, KR 920 MHz and has a range of up to >15 km in sub-urban areas and >5 km in urban areas, so the LoRaWAN™ is one of the networks specifically adapted for the IoT world, due to its low power consumption design, secure two-way low-bandwidth communications and multi-kilometers coverage. It is used as a great solution to carry data from equipment or sensors and other devices that are scattered in open areas to servers in higher capacity networks or to the Cloud.

The 3G network, consisting of a Global System for Mobile Communications (GSM) antenna 106 that includes a global 3G SIM 120 card that can be used anywhere in the world, where the user should not worry about the cellular provider, since the SIM card 120 automatically connects to the most available network. The IoT Gateway device 10 uses this network as the first option to transfer information originating from local computers or sensors to the Gateway Cloud and receive information, configuration data, updates, and commands from the Cloud, keeping the IoT 1000 gateway up-to-date and managed directly from the Cloud. The use of the 3G network ensures its operation in most urban and suburban areas of the world because it is a highly deployed standard in these areas. The L-Band satellite service includes global coverage and low latency. The IoT Gateway device 10 uses the L-Band satellite network as the last option to transfer information originated from local equipment and sensors to The Cloud, by virtue of its high cost. Device 10 further comprises a multichannel GPS module, the information of which is used to reference geospatially the data.

In an exemplary embodiment, IoT Gateway device 10 is a hybrid device that uses the 3G cellular network and the L-Band satellite network for data transmission, while receiving data from any electronic computing device and IoT sensor via Wi-Fi™®, BLE® and LoRaWAN™. IoT Gateway device 10 automatically selects the least-cost network to send information, using the 3G cellular network as primary network, and in case of failure, automatically selecting the L-Band satellite network, ensuring a 99% availability and global coverage. The L-Band satellite antenna 102 is designed to exclusively support the Short Burst Data Service data transmission service. The L-Band satellite service includes global coverage and low latency (<1 minute). And, IoT Gateway device 10 has a multi-channel GPS antenna 104 with an accuracy of 3 meters.

LoRaWAN™ is a LoRa® (long range) antenna 110, such as for Internet of Things (IoT) networks worldwide, is affixed in an exemplary embodiment to the inside surface 109 of container 64. The LoRa® Gateway Baseband Transceiver is Class A/B/C, all regions; 125 kHz LoRa® reception and can detect at any time, any packet in a combination of 8 different spreading factors (SF5 to SF12) and 10 channels and demodulate up to 16 packets at any time.

The device motherboard in layer 2 further comprises a Wi-Fi™® IEEE 802.11n antenna with a transmission speed of 54 Mbps up to 600 Mbps (FIGS. 3A-3C); and a Bluetooth® Low Energy (BLE) v4.2 receiver that includes classic Bluetooth®, high-speed Bluetooth® and low-consumption Bluetooth® protocols, allows transfer rates from 25 Mbps to 32 Mbps (FIG. 3D, Wi-Fi™®, Bluetooth® BLE chip, 152).

As illustrated in FIG. 3D, middle layer 2 further comprises the following electrical components: L-Band satellite module 112; Wi-Fi™® module 116; SIM card 120; temperature sensor 150; flash memory module/chip 240; main controller or processor 250; main regulator 260; three SMPS's 270 (for the Bluetooth® chip 152, the regulator 154, and the L-Band satellite module 112); and a SMPS and battery charge controller 272. As used herein, the term "SMPS" refers to a switched-mode power supply, which is an electronic power supply that incorporates a switching regulator to convert electrical power efficiently. Similar to other power supply types, an SMPS transfers power from a DC or AC source to DC loads, while converting voltage and current characteristics.

Powering on/off: IoT Gateway device 10 is turned off using the Gateway Management App 42 installed on a user's electronic computing device (FIG. 1B, 30) (e.g. smartphone, tablet), or remotely using the device's 30 (e.g. laptop) Web controller. Remote control of IoT Gateway device 10 prevents third parties on site from maliciously tampering and accidentally powering off.

As illustrated in FIGS. 3C-3D, the bottom layer 3 comprises: a rechargeable battery 210; a series of solar charger wire connection 5 between rechargeable battery 210 and top solar panel 80; and Qi charge receiver coil 230. Battery 210 lasts up to 78 hours with a moderate use and without the need for solar or electric charging, if the battery is 100% charged when installed. In an exemplary embodiment, battery 210 is a Li-ion 3.6V, 20.4 Ah, with dimensions of about: 112 mm by 21 mm by 21 mm. Battery consumption may vary for multiple reasons: frequency of sending information;

type of network used to send information, the L-Band satellite network has higher consumption; and number of connected devices As illustrated in FIGS. 2D and 2E, battery 210 can also be recharged by placing a Qi charger 88 beneath device 10's bottom surface at icon or marking 82, which aligns with receiver coil 230.

As illustrated in FIGS. 2A, 2C, 2E, and 3C, battery 210 (as a first, primary method of being a self-powered charging device) can also be recharged via the solar panel 80, which is fitted into a substantially rectangular or square shaped depression on lid 62. In an embodiment, solar panel 80 has a cellular efficiency of about 22 percent, and dimensions in millimeters of about: 89 (L)×67 (W)×2.0 (H). Table 1 also lists characteristics of an exemplified solar panel for use in device 10.

TABLE 1

| Symbol | Cell Parameter | Typical Ratings | Units |
| --- | --- | --- | --- |
| VOC | open circuit voltage | 6.3 | V |
| ISC | short circuit current | 200 | mA |
| Vmpp | voltage at max. power point | 5.00 | V |
| Impp | current at max. power point | 178 | mA |
| Pmpp | maximum peak power | 892 | Mw |
| FF | fill factor | >70 | % |
| η | solar cell efficiency | 22 | % |
| ΔVOC/ΔT | open circuit voltage temp. coefficient | −2.1 | mV/K |
| ΔJSC/ΔT | short circuit current temp. coefficient | 0.12 | mA/(cm$^2$ K) |

Method of IoT Gateway Device Installation

The Gateway device 10 mounting location is critical to ensure a safe installation and reliable operation. For reliable operation and optimal L-Band satellite performance, the installer should consider the following guidelines. The location must provide a safe and secure installation. Device 10 is not intended to be operated near a person; and it should be mounted more than 20 cm from persons for compliance with RF exposure limits. Likewise, it should not be installed inside a building or under metal surfaces; but rather outside on a flat, horizontal mounting location for optimal uniform L-Band satellite performance, with an unobstructed view of the sky. The device 10's anchor feet (FIGS. 2D-2E, 70) can be used to secure device 10 to a fixed location (e.g. ground).

The distance of the Gateway device 10 from the IoT sensor(s) 40 that it wirelessly collects data from will determine what wireless network 20 is primarily used. For example, WiFi™® is used for distances up to 46 meters; Bluetooth® is used for distances up to 100 meters; and the LoRaWAN™ network is used for distances up to 15 kilometers. Propagation of the signal may be reduced by environmental factors such as dense foliage or permanent structures and buildings for example.

IoT Gateway Management Mobile Application

As illustrated in FIGS. 1B and 4A-4D, the various embodiments further comprises an IoT Gateway Management mobile application 42 running on a user's electronic computing device 30 (e.g. an Android or IOS), that is either installed on the device, or accessible via a wireless network. Hence, the various embodiments further comprise a non-transitory computer readable storage medium with instructions for operation of the Gateway device 10 as disclosed herein.

The various embodiments further comprises a method of use of the Gateway device 10 with the mobile application 42 or via the Gateway Cloud Application to monitor and control the operation of the gateway device 10's, comprising: 1) linking each Gateway device 10 to a user's mobile app 42, e.g. via scanning a QR code posted on the device 10; 2) displaying on the user's device a geographic map marking the location of each Gateway device 10 (i.e. a device identification number) that a user is monitoring and the data associated with it (see FIGS. 4A-4C).

Mobile Application 42 is also for mobile equipment for local Control and Administration of Gateway device 10's. App 42 is designed to be able to run on the main operating systems of mobile computers and allows to connect locally, according to the coverage characteristics of BLE technology, to perform tasks of querying information, configuration and updating the Gateway devices within its scope, always one at a time, without requiring access to the internet.

As illustrated in the screen shots of FIGS. 4A-4D, mobile app 42 displays the information for each Gateway device 10 that it is linked to, and multiple device 10's can be located on a map. For example, in FIG. 4A, the Gateway device 10 with the identification number 4223064 is displayed, and if the user selects the location, a screen such as shown in FIG. 4B, will display the device's: battery level, IMEI, HDOP, GPS information like latitude, longitude, speed, direction etc. FIG. 4C is a screen shot of another display with device 10 information comprising: battery level 156, Gateway location, course, firmware version, GSM and L-Band satellite Signal strength 157, time elapsed since last successfully updated, geofencing, GPS, LoRa®, Wi-Fi™® and BLE connection status 158, and reporting intervals 160. FIG. 4D is a screen shot illustrating how the user is able to set the data report interval 160 for the different networks.

The present system 100 also delivers data collected by software (e.g. mobile app's) associated with the 3$^{rd}$ party IoT sensors. Per FIG. 1A, the 3$^{rd}$ party data can be wirelessly transmitted from the IoT sensor 40 to the Gateway device 10 and onto the user's Gateway Cloud account 50 using the Gateway device 10's wireless connections. Mobile app 42 will not display this 3$^{rd}$ party data (e.g. field humidity, temperature, etc.), which instead will be viewed in the third party's mobile app.

EXEMPLIFICATION

The following is an exemplification in the method of use the Gateway device 10 to monitor at least one IoT sensor. The initial state of the IoT gateway device 10 and all its components are in a hibernation mode, consuming as little battery charge as possible, and allowing chargers, both solar, Qi or external, to recover the battery charge, as long as there is an external Qi charger or sunlight bathing the built-in solar panel, or, if there is an external source of energy. During the initial process, or with "factory settings", device 10 remains in hibernation until it detects that it has received sunlight on its panel, for at least five minutes, which triggers a connection process to the Gateway Cloud to register and retrieve its settings and updates that are scheduled for it. From this point on, and as long as external equipment or sensors are not connected, there is only one timer used to synchronize clocks with the GPS network and obtain and report the Gateway device 10's geolocation to the Gateway Cloud. As equipment or sensors are added to the networked system 100, they are added to the timer cycles to listen or collect their data and store them temporarily. When the configured time is met, the IoT Gateway device 10 "wakes up" and begins a cycle of verifying and booting the components needed to perform a user's tasks.

At the end of the start-up, the process of obtaining data from the equipment or sensors begins, starting with the internal GPS, from which the user obtains, among others, the following data: 1) UTC date and time reported by GPS L-Band satellites; and this data is used for the IoT Gateway Device 10 to adjust its internal clock; 2) Latitude and Geospatial Longitude of device 10; 3) Altitude above sea level; 4) Speed and/or course (in case device 10 is in motion); 5) Number of L-Band satellites with which this reading was obtained; and 6) HDOP (Horizontal Dilution of Precision) indicates the accuracy of the data obtained. Note: All date and time data that is processed displayed or stored on these services is always in UTC/GMT (Greenwich Mean Time) time, to avoid confusion or misunderstanding over different time zones.

FIG. 4C is an exemplary screen shot of a Gateway mobile app 42 displaying the status of a device 10 (ID 4219567). The screen shot displays the following: device location, course, firmware version, GSM and L-Band satellite Signal strength, time elapsed since last successfully updated, geofencing, GPS, LoRa®, Wi-Fi™® and BLE connection status.

Figure 5:
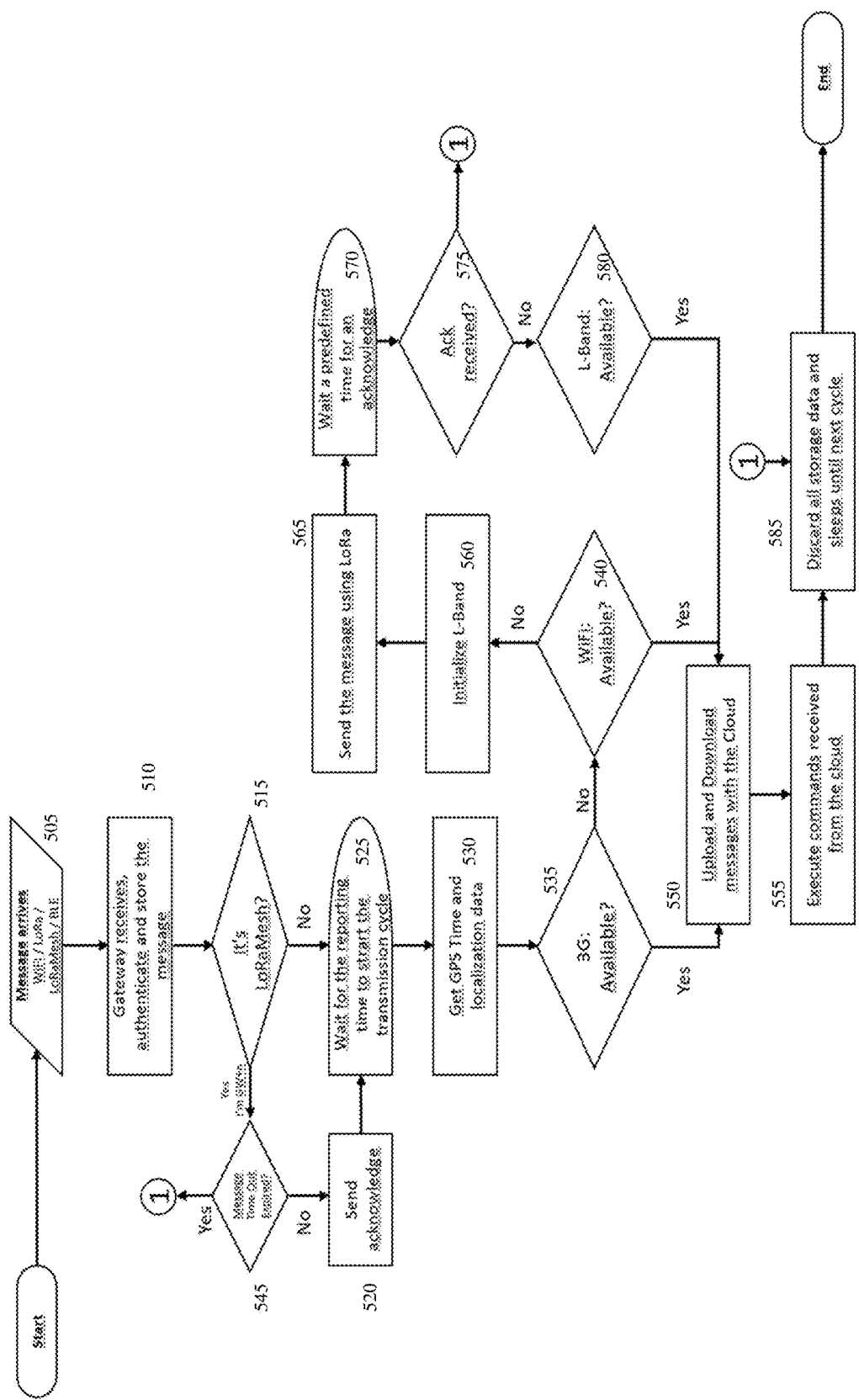
FIG. 5 is a flowchart of gateway device(s) steps in transmitting data to from the gateway device to the Gateway Cloud using one or more of: 3G, WiFi™, LoRa, and L-Band routes.

The steps in the method of use of the wireless network of FIG. 1A is illustrated in FIG. 5. Once the data is obtained (505), it is analyzed against the internally configured geofences, e.g., virtual geographic boundaries, defined by, e.g., GPS, that enables software to trigger a response when a mobile device enters or leaves a particular area, e.g. to determine if there is any violation to report. A data string is generated in a default format, with positioning data and possible alarms, and the report cycle begins once the Gateway device has received the sensor data (FIG. 5, 510). If the Gateway confirms that the message received is from LoRaMesh (515). If it is, means that this is the Gateway n+1, and sends an acknowledgement to the previous Gateway on the mesh (Gateway n−1) (520). If not, the system waits for the reporting cycle time (525). The Gateway gets the GPS time and location data (530), and determines if the 3G network is available (535). If it is, then it uploads and downloads messages to from the Gateway Cloud (550) and executes commands received from the Gateway Cloud (555). Then it discards all stored data and sleeps until next report cycle time (585).

If at step 535 the 3G network is not available, then the system checks to see if the Wi-Fi network is available (540). If it is, then is carries out the same steps 550, 555 and 585 as before. If it is not, then the system initialized L-band (560), and sends the message using LoRa (565). The system waits for acknowledgement of the message receipt within a predetermined time (570), acknowledges receipt (575), if acknowledgement is received then goes to (585). Otherwise, it determines if the L-band network is available (580). It so, then if follows steps 550, 555 and 585 as before.

Device 10 first tries to reach the Gateway Cloud using its own 3G radio frequencies (535); and if this connection is not successful (535), then it tries to relay the data via Wi-Fi™ frequencies to a connected broadband link (540) When the data is delivered successfully (550), then the gateway discards all stored data and ends the data delivery cycle and returns to sleep mode without further action (560). If the gateway could not successfully deliver the data to the Gateway Cloud via Wi-Fi (540), it then sends the data using LoRa® frequencies to all IoT Gateway devices in its range (565); and waits for an acknowledgement for a predefined time (570) while the satellite chip is initiated to be ready to send the data using L-Band satellite frequencies (560). If an acknowledge is not received within the predefined wait time (575), then the original gateway attempts to send the data via L-Band satellite frequencies (580). If the data was delivered successfully via satellite (550), then the gateway ends the cycle and returns to sleep mode without further action (550, 555 and 585). If the latter is still not successful, then the data is discarded, and the gateway goes back to sleep mode (585) until the next cycle when new data is received from the equipment or sensor (505). In the event the originating gateway does receive an acknowledgement within the predefined wait time (575), the satellite transmission is not performed, the gateway ends its cycle and returns to sleep mode without further action (585). Now the networked gateway (n+1) (FIG. 5, 515), which received the relayed information from the originating gateway (n) (FIG. 5, 515) via the LoRa® frequencies, starts a similar cycle of events as the ones described above (FIG. 5, 55-585) which, if not successful at the end, ends with the data also being discarded (585).

The user is also able to view the IoT sensor data stored in their Gateway Cloud account using third party software associated with the sensors. For example, while the user's Gateway Cloud account can store and process IoT sensor data, to view it the user accesses a third party mobile application associated with the IoT sensors in an agriculture field and statistical analysis done on the data, where the data was wirelessly transmitted for storage on the user's Gateway Cloud account.

FIGS. 6A and 6B show a table 600 describing examples of different types of data 602 from sensors (e.g. IoT sensors), which may be used by different industries 604 in different markets 606. FIG. 6A table lists the Oil and Gas industry 604 covering the Pipeline market 606, and the types of data (e.g. measuring or detecting humidity, etc.) collected by the sensors that is transmitted using the system of FIG. 1A of the present invention. FIG. 6A also covers the Agriculture industry 604 covering the Livestock Monitoring and the Greenhouse markets 606, and the types of data the Gateway devices 10 of the present invention process.

Likewise, FIG. 6B covers the Agriculture industry 604 transmitting from IoT sensors to the Gateway devices 10 a plurality of Fields, Crops, and Vineyard data and the types of data (e.g. soil moisture, temperature data). The table of FIG. 6B also covers the ATM Payment Industry, the Sports Field Industry, and the Tracking Industry using the system (FIG. 1A, FIG. 7) of the present invention to transmit sensor data cost effectively to a Cloud account.

Figure 7:
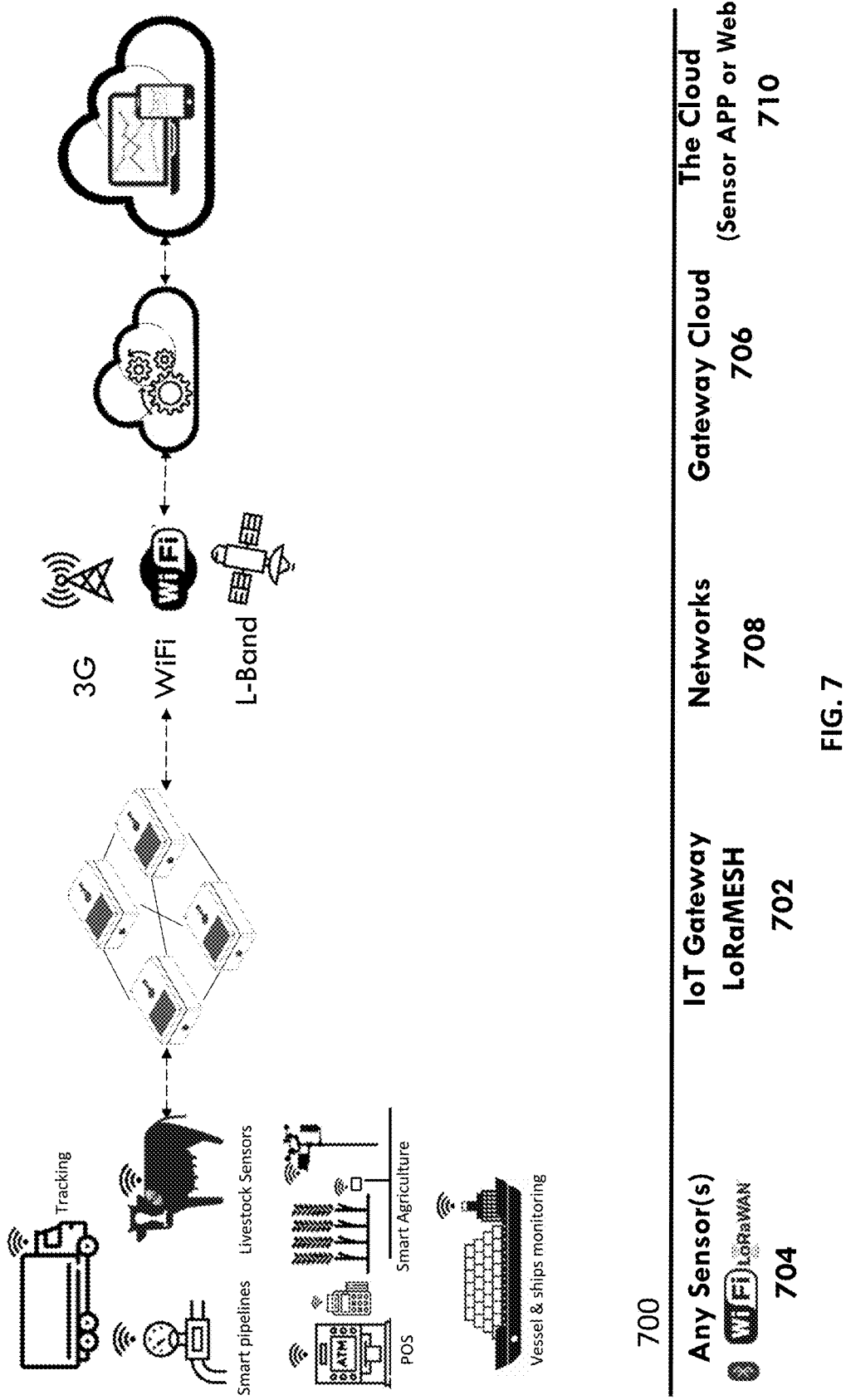
FIG. 7 is a high-level diagram of a LoRaMesh algorithm that may be used by a system according to an embodiment.

FIG. 7 is another high level diagram of a LoRaMesh algorithm which may be used by a system 700 according to an embodiment. The LoRaMesh algorithm used in the system 700 shown in FIG. 7 may include a series of instructions performed by the Gateway processor to deliver the sensor data using one or more Gateways connected in a meshed architecture to the Gateway Cloud. Once the Gateway device 702 receives the sensor data from computers or IoT sensors 704, it delivers it to the Gateway Cloud 706 using a least cost routing criterion over different available networks 708 in the LoRaMesh algorithm. The data received by the first Gateway device tries to reach the Gateway Cloud using its own 3G radio frequencies. If this connection is not successful, then it tries to relay the data via Wi-Fi™ frequencies to a connected broadband link. If the data is delivered successfully, then the Gateway ends the data delivery cycle and returns to sleep mode without further action. If the Gateway could not successfully deliver the data to the Gateway Cloud via Wi-Fi™, it then sends the data using LoRa® frequencies to all Gateway devices in its range and waits for an acknowledgement for a predefined time while the satellite chip is initiated and gets ready to send the data using L-Band satellite frequencies. If an acknowledge message is not received within a predefined wait time, then the first Gateway device attempts to send the data via L-Band satellite frequencies. If the data was delivered successfully, then the Gateway device ends the cycle and returns to sleep mode without further action. If the latter is still not successful, then the data is discarded and the Gateway device goes back to sleep mode, until the next cycle when new data is received from the equipment or sensor. In the event a networked Gateway device (second, third, etc.) sends its acknowledge message within the allotted time, then the originating Gateway device, upon receipt of this acknowledge, relays the data to the meshed Gateway, ends its cycle and cancels any more attempts to relay or transmit the data. Now the Gateway which confirmed the data received via an acknowledge message (second, third, etc.) starts a similar cycle of events as the one described above which, if not successful in reaching the Gateway Cloud, ends with the data discarded. In all cases the Gateway, prior to sending the data to the Cloud, tags the data geospatially using its own GPS, and formats the data frame with sensor and Gateway information appending, without modifications, the sensor data. Once it reaches the Gateway Cloud, the data is returned to its original form and format and is delivered to the end-user application. This makes the data appear to be sent to the application directly by the sensor and all Gateway activity is transparent to the end-user application 710. The later enables the Gateway to use a myriad of sensors in each area, delivered to one or many independent applications transparently without compromising encryption codes and formats used by each sensor and its related application in the Cloud.

It will be appreciated that the methods and compositions and compounds of the present disclosure can be incorporated in the form of a variety of embodiments, only a few of which are disclosed herein. It will also be apparent for the expert skilled in the field that other embodiments exist and do not depart from the spirit of the invention. Thus, the described embodiments are illustrative and should not be construed as restrictive.

Accordingly, the preceding exemplifications merely illustrate the principles of the various embodiments. It will be appreciated that those skilled in the art will be able to devise various arrangements which, although not explicitly described or shown herein, embody the principles of the embodiments and are included within its spirit and scope. Furthermore, all examples and conditional language recited herein are principally intended to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the various embodiments, therefore, is not intended to be limited to the exemplary embodiments shown and described herein.

The technology illustratively described herein suitably may be practiced in the absence of any element(s) not specifically disclosed herein. The terms and expressions which have been employed are used as terms of description and not of limitation, and use of such terms and expressions do not exclude any equivalents of the features shown and described or portions thereof, and various modifications are possible within the scope of the technology claimed. The term "a" or "an" can refer to one of or a plurality of the elements it modifies (e.g., "a reagent" can mean one or more reagents) unless it is contextually clear either one of the elements or more than one of the elements is described. The term "about" as used herein refers to a value within 10% of the underlying parameter (i.e., plus or minus 5%), and use of the term "about" at the beginning of a string of values modifies each of the values (i.e., "about 1, 2 and 3" refers to about 1, about 2 and about 3). Further, when a listing of values is described herein (e.g., about 50%, 60%, 70%, 80%, 85% or 86%) the listing includes all intermediate and fractional values thereof (e.g., 54%, 85.4%). Thus, it should be understood that although the present technology has been specifically disclosed by representative embodiments and optional features, modification and variation of the concepts herein disclosed may be resorted to by those skilled in the art, and such modifications and variations are considered within the scope of this technology.

As used herein, the term "substantially" refers to approximately the same shape as stated as recognized by one of ordinary skill in the art.

While several embodiments of the disclosure have been described, it is not intended that the disclosure be limited thereto, as it is intended that the disclosure be as broad in scope as the art will allow and that the specification be read likewise. Therefore, the above description should not be construed as limiting, but merely as exemplifications of embodiments.

Trademarks: the product names used in this document are for identification purposes only; and are the property of their respective owners.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

What is claimed is:

1. An IoT Gateway device, comprising: a gateway device housing storing a plurality of electrical components, comprising:
   1) a rechargeable battery;
   2) at least one processor, and a memory;

3) a plurality of independent telecommunications network components, wherein at least one of the independent telecommunications network components comprise antennas and modules for a satellite network and at least one of the independent telecommunications network components comprise antennas and modules for a terrestrial network; and 4) wherein said network components are configurable to operate simultaneously in a plurality of radio frequencies to wirelessly transmit data unchanged from one or more sensors or equipment to a gateway device using any available network components, and then wirelessly transmit the data for storage and processing on a user Gateway Cloud account using a least cost route operation.

2. The gateway device of claim 1, wherein the plurality of independent telecommunications network components comprise antennas and modules for Wi-Fi™®, Bluetooth®/BLE, LoRa®, 3G cell phone GSM, GPS, and L-Band satellite.

3. The gateway device of claim 2, wherein the network components further comprise a printed radio wave antenna circuit card, comprising: a L-Band satellite antenna, a Global positioning antenna (GPS); and a 3G GSM wireless antenna.

4. The gateway device of claim 3, further comprising a motherboard positioned horizontally, stably beneath the antenna circuit card, said motherboard affixing the processor, and the memory; and four or more of:
1) a Bluetooth®/ Wi-Fi™ antenna chip;
2) a 3G and GPS module and a SIM card;
3) a L-Band satellite module; and
4) one or more components of a LoRa® antenna unit.

5. The gateway device of claim 2, wherein the network components further comprise a printed radio wave antenna circuit card, comprising: a L-Band satellite antenna, a Global positioning antenna (GPS); and a 3G GSM wireless antenna.

6. The gateway device of claim 5, wherein the rechargeable battery is positioned horizontally beneath the motherboard.

7. The gateway device of claim 1, wherein the one or more sensors comprise Internet of Things (IoT) sensors.

8. The gateway device of claim 1, wherein the housing further comprises at least one of a solar panel and a Qi charge receiver coil operable to recharge the battery.

9. The gateway device of claim 8, wherein the firmware further comprises non-transitory computer readable storage memory with coded instructions to enable the gateway device to wirelessly transmit data between a user's electronic computing device having installed thereon a mobile application for controlling the operation of and monitoring the status of the gateway device.

10. The gateway device of claim 1, further comprising firmware as non-transitory computer readable storage memory with coded instructions that control the operation of the Gateway device, and wherein said firmware can be wirelessly updated.

11. A method comprising:
receiving at a gateway device data in a first format from a first sensor;
performing a least cost route operation over a plurality of networks, said networks including at least a satellite network and a terrestrial network; and
in response to the least cost route operation, transmitting the data securely in the first format to a user Gateway Cloud account.

12. The method of claim 11, further comprising:
tagging the data with a GPS data of the gateway device.

13. The method of claim 11, further comprising:
receiving the data at the user Gateway Cloud account and transferring to a user mobile or web-based application in the first format.

14. The method of claim 11 wherein the at least one terrestrial network comprises at least one of Wi-Fi™, Bluetooth®, LoRa®, and 3G GSM.

15. The method of claim 11 wherein the at least two satellite network comprises at least one of GPS and one of L-Band satellite.

16. The method of claim 11, wherein said gateway device comprises a gateway device housing storing a plurality of electrical components, comprising:
1) a rechargeable battery;
2) at least one processor, and a memory;
3) a plurality of independent telecommunications network components, wherein at least one of the independent telecommunications network components comprise antennas and modules for a satellite network and at least one of the independent telecommunications network components comprise antennas and modules for a terrestrial network; and
4) wherein said network components are configurable to operate simultaneously in a plurality of radio frequencies to wirelessly transmit data unchanged from one or more sensors or equipment to a gateway device using any available network components, and then wirelessly transmit the data for storage and processing on a user Gateway Cloud account using a least cost route operation.

17. A computer program product, comprising a non-transitory machine- readable storage medium having encoded therein executable code of one or more software programs, wherein the one or more software programs when executed by at least one processor on a user electronic computing device performs the following steps of:
receiving at a gateway device data in a first format from a first sensor;
performing a least cost route operation over a plurality of networks, said networks including at least a satellite network and a terrestrial network; and
in response to the least cost route operation, transmitting the data securely in the first format to a user Gateway Cloud account.

18. The computer program product of claim 17, wherein said gateway device comprises a gateway device housing storing a plurality of electrical components, comprising:
1) a rechargeable battery;
2) at least one processor, and a memory;
3) a plurality of independent telecommunications network components, wherein at least one of the independent telecommunications network components comprise antennas and modules for a satellite network and at least one of the independent telecommunications network components comprise antennas and modules for a terrestrial network; and
4) wherein said network components are configurable to operate simultaneously in a plurality of radio frequencies to wirelessly transmit data unchanged from one or more sensors or equipment to a gateway device using any available network components, and then wirelessly transmit the data for storage and processing on a user Gateway Cloud account using a least cost route operation.

* * * * *